US009747613B2

(12) United States Patent
Rajan et al.

(10) Patent No.: US 9,747,613 B2
(45) Date of Patent: *Aug. 29, 2017

(54) DYNAMIC ELECTRONIC COUPON FOR A MOBILE ENVIRONMENT

(71) Applicant: QUALCOMM Incorporated, San Diego, CA (US)

(72) Inventors: Rajeev D. Rajan, San Diego, CA (US); Kamran Moallemi, Carlsbad, CA (US); Michal Koenig, Encinitas, CA (US); Oliver Michaelis, San Diego, CA (US); Paul E. Jacobs, La Jolla, CA (US); Jose Ricardo Goncalves Leal Dos Santos, Seattle, WA (US); Dang Minh Vo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/269,549

(22) Filed: Sep. 19, 2016

(65) Prior Publication Data

US 2017/0068983 A1 Mar. 9, 2017

Related U.S. Application Data

(63) Continuation of application No. 12/142,159, filed on Jun. 19, 2008, now Pat. No. 9,483,769.

(Continued)

(51) Int. Cl.
*H04M 3/42* (2006.01)
*G06Q 30/02* (2012.01)

(52) U.S. Cl.
CPC ......... *G06Q 30/0225* (2013.01); *G06Q 30/02* (2013.01)

(58) Field of Classification Search
USPC .... 455/412.1–414.3, 419–420, 456.1–456.3, 455/457, 466
See application file for complete search history.

(56) References Cited

U.S. PATENT DOCUMENTS

| 4,006,477 A | 2/1977 | Yost, Jr. et al. |
| 5,382,957 A | 1/1995 | Blume |

(Continued)

FOREIGN PATENT DOCUMENTS

| CN | 1432949 A | 7/2003 |
| CN | 1633660 A | 6/2005 |

(Continued)

OTHER PUBLICATIONS

Bardia Alavi, et al., "Indoor Geolocat ion Distance Error Modeling using UWB Channel Measurements", 2005 IEEE 16th International Symposium on Personal, Indoor and Mobile Radio Communications, Sep. 11-14, 2005.

(Continued)

*Primary Examiner* — Dai A Phuong

(57) ABSTRACT

Dynamic mobile coupons (DMCs) having a variable commercial value and/or other variable coupon characteristic are provided herein. By way of example, a DMC can be distributed to a mobile device based on criteria established by a sponsor of the DMC. A redemption value of the DMC can be variable and dynamically established based at least in part on data associated with a recipient mobile device. Upon redemption of the DMC at a retail entity, the value is fixed and applied to a transaction. Details of the transaction are provided to a remote clearinghouse that performs mediation and indemnification functions to finalize the transaction. As described, the subject disclosure provides a DMC that facilitates a rich and flexible mechanism to generate purchasing incentive for consumers in a mobile environment.

30 Claims, 12 Drawing Sheets

Related U.S. Application Data

(60) Provisional application No. 60/945,098, filed on Jun. 20, 2007.

(56) References Cited

U.S. PATENT DOCUMENTS

| | | |
|---|---|---|
| 5,687,169 A | 11/1997 | Fullerton |
| 5,764,696 A | 6/1998 | Barnes et al. |
| 5,812,081 A | 9/1998 | Fullerton |
| 5,832,035 A | 11/1998 | Fullerton |
| 5,907,427 A | 5/1999 | Scalora et al. |
| 5,952,956 A | 9/1999 | Fullerton |
| 5,960,031 A | 9/1999 | Fullerton et al. |
| 5,963,581 A | 10/1999 | Fullerton et al. |
| 5,969,663 A | 10/1999 | Fullerton et al. |
| 5,970,148 A | 10/1999 | Meier |
| 5,995,534 A | 11/1999 | Fullerton et al. |
| 6,025,795 A | 2/2000 | Hulderman et al. |
| 6,031,862 A | 2/2000 | Fullerton et al. |
| 6,091,374 A | 7/2000 | Barnes |
| 6,111,536 A | 8/2000 | Richards et al. |
| 6,133,876 A | 10/2000 | Fullerton et al. |
| 6,177,903 B1 | 1/2001 | Fullerton et al. |
| 6,218,979 B1 | 4/2001 | Barnes et al. |
| 6,295,019 B1 | 9/2001 | Richards et al. |
| 6,297,773 B1 | 10/2001 | Fullerton et al. |
| 6,300,903 B1 | 10/2001 | Richards et al. |
| 6,304,623 B1 | 10/2001 | Richards et al. |
| 6,332,193 B1 | 12/2001 | Glass et al. |
| 6,351,652 B1 | 2/2002 | Finn et al. |
| 6,354,946 B1 | 3/2002 | Finn |
| 6,400,307 B2 | 6/2002 | Fullerton et al. |
| 6,400,329 B1 | 6/2002 | Barnes |
| 6,421,389 B1 | 7/2002 | Jett et al. |
| 6,430,208 B1 | 8/2002 | Fullerton et al. |
| 6,437,756 B1 | 8/2002 | Schantz |
| 6,462,701 B1 | 10/2002 | Finn |
| 6,466,125 B1 | 10/2002 | Richards et al. |
| 6,469,628 B1 | 10/2002 | Richards et al. |
| 6,483,461 B1 | 11/2002 | Matheney et al. |
| 6,489,893 B1 | 12/2002 | Richards et al. |
| 6,492,904 B2 | 12/2002 | Richards |
| 6,492,906 B1 | 12/2002 | Richards et al. |
| 6,501,393 B1 | 12/2002 | Richards et al. |
| 6,504,483 B1 | 1/2003 | Richards et al. |
| 6,512,455 B2 | 1/2003 | Finn et al. |
| 6,512,488 B2 | 1/2003 | Schantz |
| 6,519,464 B1 | 2/2003 | Santhoff et al. |
| 6,529,568 B1 | 3/2003 | Richards et al. |
| 6,538,615 B1 | 3/2003 | Schantz |
| 6,539,213 B1 | 3/2003 | Richards et al. |
| 6,549,567 B1 | 4/2003 | Fullerton |
| 6,552,677 B2 | 4/2003 | Barnes et al. |
| 6,556,621 B1 | 4/2003 | Richards et al. |
| 6,560,463 B1 | 5/2003 | Santhoff |
| 6,571,089 B1 | 5/2003 | Richards et al. |
| 6,573,857 B2 | 6/2003 | Fullerton et al. |
| 6,577,691 B2 | 6/2003 | Richards et al. |
| 6,585,597 B2 | 7/2003 | Finn |
| 6,593,886 B2 | 7/2003 | Schantz |
| 6,606,051 B1 | 8/2003 | Fullerton et al. |
| 6,611,234 B2 | 8/2003 | Fullerton et al. |
| 6,611,811 B1 | 8/2003 | Deaton et al. |
| 6,614,384 B2 | 9/2003 | Hall et al. |
| 6,614,387 B1 | 9/2003 | Deadman |
| 6,621,462 B2 | 9/2003 | Barnes |
| 6,636,566 B1 | 10/2003 | Roberts et al. |
| 6,636,567 B1 | 10/2003 | Roberts et al. |
| 6,636,573 B2 | 10/2003 | Richards et al. |
| 6,642,903 B2 | 11/2003 | Schantz |
| 6,650,894 B1 | 11/2003 | Berstis et al. |
| 6,661,342 B2 | 12/2003 | Hall et al. |
| 6,667,724 B2 | 12/2003 | Barnes et al. |
| 6,670,909 B2 | 12/2003 | Kim |
| 6,671,310 B1 | 12/2003 | Richards et al. |
| 6,674,396 B2 | 1/2004 | Richards et al. |
| 6,677,796 B2 | 1/2004 | Brethour et al. |
| 6,700,538 B1 | 3/2004 | Richards |
| 6,710,736 B2 | 3/2004 | Fullerton et al. |
| 6,717,992 B2 | 4/2004 | Cowie et al. |
| 6,748,040 B1 | 6/2004 | Johnson et al. |
| 6,750,757 B1 | 6/2004 | Gabig, Jr. et al. |
| 6,759,948 B2 | 7/2004 | Grisham et al. |
| 6,760,387 B2 | 7/2004 | Langford et al. |
| 6,762,712 B2 | 7/2004 | Kim |
| 6,763,057 B1 | 7/2004 | Fullerton et al. |
| 6,763,282 B2 | 7/2004 | Glenn et al. |
| 6,774,764 B2 | 8/2004 | Ghosh et al. |
| 6,774,846 B2 | 8/2004 | Fullerton et al. |
| 6,774,859 B2 | 8/2004 | Schantz et al. |
| 6,778,603 B1 | 8/2004 | Fullerton et al. |
| 6,781,530 B2 | 8/2004 | Moore |
| 6,782,048 B2 | 8/2004 | Santhoff |
| 6,788,730 B1 | 9/2004 | Richards et al. |
| 6,822,604 B2 | 11/2004 | Hall et al. |
| 6,823,022 B1 | 11/2004 | Fullerton et al. |
| 6,836,223 B2 | 12/2004 | Moore |
| 6,836,226 B2 | 12/2004 | Moore |
| 6,844,816 B1 | 1/2005 | Melton et al. |
| 6,845,253 B1 | 1/2005 | Schantz |
| 6,847,675 B2 | 1/2005 | Fullerton et al. |
| 6,862,575 B1 | 3/2005 | Anttila et al. |
| 6,879,878 B2 | 4/2005 | Glenn et al. |
| 6,882,301 B2 | 4/2005 | Fullerton |
| 6,895,034 B2 | 5/2005 | Nunally et al. |
| 6,895,236 B2 | 5/2005 | Shuster |
| 6,898,434 B2 | 5/2005 | Pradhan et al. |
| 6,900,732 B2 | 5/2005 | Richards |
| 6,906,625 B1 | 6/2005 | Taylor et al. |
| 6,907,244 B2 | 6/2005 | Santhoff et al. |
| 6,907,270 B1 | 6/2005 | Blanz |
| 6,912,240 B2 | 6/2005 | Kumar et al. |
| 6,914,949 B2 | 7/2005 | Richards et al. |
| 6,917,280 B1 | 7/2005 | Griffith et al. |
| 6,919,838 B2 | 7/2005 | Santhoff |
| 6,922,166 B2 | 7/2005 | Richards et al. |
| 6,922,177 B2 | 7/2005 | Barnes et al. |
| 6,925,109 B2 | 8/2005 | Richards et al. |
| 6,933,882 B2 | 8/2005 | Fullerton |
| 6,937,639 B2 | 8/2005 | Pendergrass et al. |
| 6,937,663 B2 | 8/2005 | Jett et al. |
| 6,937,667 B1 | 8/2005 | Fullerton et al. |
| 6,937,674 B2 | 8/2005 | Santhoff et al. |
| 6,947,492 B2 | 9/2005 | Santhoff et al. |
| 6,950,485 B2 | 9/2005 | Richards et al. |
| 6,954,480 B2 | 10/2005 | Richards et al. |
| 6,959,031 B2 | 10/2005 | Haynes et al. |
| 6,959,032 B1 | 10/2005 | Richards et al. |
| 6,961,285 B2 | 11/2005 | Niemiec et al. |
| 6,961,541 B2 | 11/2005 | Overy et al. |
| 6,963,727 B2 | 11/2005 | Shreve |
| 6,980,613 B2 | 12/2005 | Krivokapic |
| 6,989,751 B2 | 1/2006 | Richards |
| 7,002,473 B2 | 2/2006 | Glick et al. |
| 7,003,289 B1 | 2/2006 | Kolls |
| 7,010,290 B2 | 3/2006 | Dent |
| 7,015,793 B2 | 3/2006 | Gabig, Jr. et al. |
| 7,020,224 B2 | 3/2006 | Krivokapic |
| 7,026,983 B2 | 4/2006 | Spratt |
| 7,027,425 B1 | 4/2006 | Fullerton et al. |
| 7,027,483 B2 | 4/2006 | Santhoff et al. |
| 7,027,493 B2 | 4/2006 | Richards |
| 7,030,806 B2 | 4/2006 | Fullerton |
| 7,039,392 B2 | 5/2006 | McCorkle et al. |
| 7,042,417 B2 | 5/2006 | Santhoff et al. |
| 7,046,187 B2 | 5/2006 | Fullerton et al. |
| 7,046,618 B2 | 5/2006 | Santhoff et al. |
| 7,058,414 B1 | 6/2006 | Rofheart et al. |
| 7,069,111 B2 | 6/2006 | Glenn et al. |
| 7,075,476 B2 | 7/2006 | Kim |
| 7,079,827 B2 | 7/2006 | Richards et al. |
| 7,098,769 B2 | 8/2006 | Ott |
| 7,099,367 B2 | 8/2006 | Richards et al. |
| 7,099,368 B2 | 8/2006 | Santhoff et al. |
| 7,116,266 B1 | 10/2006 | Vesel et al. |

(56) References Cited

U.S. PATENT DOCUMENTS

| | | |
|---|---|---|
| 7,119,659 B2 | 10/2006 | Bonalle et al. |
| 7,129,886 B2 | 10/2006 | Hall et al. |
| 7,132,975 B2 | 11/2006 | Fullerton et al. |
| 7,139,647 B2 | 11/2006 | Larsen |
| 7,145,954 B1 | 12/2006 | Pendergrass et al. |
| 7,148,791 B2 | 12/2006 | Grisham et al. |
| 7,149,533 B2 | 12/2006 | Laird et al. |
| 7,151,490 B2 | 12/2006 | Richards |
| 7,167,525 B2 | 1/2007 | Santhoff et al. |
| 7,170,408 B2 | 1/2007 | Taylor et al. |
| 7,178,719 B2 | 2/2007 | Silverbrook et al. |
| 7,181,192 B2 | 2/2007 | Panasik et al. |
| 7,184,938 B1 | 2/2007 | Lansford et al. |
| 7,188,244 B2 | 3/2007 | Matsuno |
| 7,190,722 B2 | 3/2007 | Lakkis et al. |
| 7,190,729 B2 | 3/2007 | Siwiak |
| 7,206,334 B2 | 4/2007 | Siwiak |
| 7,206,559 B2 | 4/2007 | Meade et al. |
| 7,209,724 B2 | 4/2007 | Richards et al. |
| 7,209,753 B2 | 4/2007 | Raith et al. |
| 7,230,980 B2 | 6/2007 | Langford et al. |
| 7,239,277 B2 | 7/2007 | Fullerton et al. |
| 7,245,900 B1 | 7/2007 | Lamb et al. |
| RE39,759 E | 8/2007 | Fullerton |
| 7,256,727 B2 | 8/2007 | Fullerton et al. |
| 7,271,779 B2 | 9/2007 | Hertel |
| 7,277,715 B2 | 10/2007 | Starr et al. |
| 7,308,356 B2 | 12/2007 | Melaku et al. |
| 7,310,532 B2 | 12/2007 | Knauerhase et al. |
| 7,363,494 B2 | 4/2008 | Brainard et al. |
| 7,366,509 B2 | 4/2008 | Akgun et al. |
| 7,383,984 B2 | 6/2008 | Silverbrook et al. |
| 7,398,392 B2 | 7/2008 | Weber |
| 7,505,443 B2 | 3/2009 | McNew et al. |
| 7,554,979 B2 | 6/2009 | Ikeda |
| 7,581,113 B2 | 8/2009 | Smith et al. |
| 7,724,705 B2 | 5/2010 | Erola et al. |
| 7,739,157 B2 | 6/2010 | Bonner et al. |
| 7,783,532 B2 | 8/2010 | Hsu et al. |
| 7,818,762 B2 | 10/2010 | Liu et al. |
| 7,870,021 B2 | 1/2011 | Mankoff |
| 7,870,229 B2 | 1/2011 | Spector |
| 7,933,895 B2 | 4/2011 | Amjadi |
| 8,332,270 B2 | 12/2012 | Sprigg et al. |
| 8,552,903 B2 | 10/2013 | Julian et al. |
| 8,595,070 B1 | 11/2013 | Barnes et al. |
| 8,837,724 B2 | 9/2014 | Rose et al. |
| 8,886,125 B2 | 11/2014 | Agrawal et al. |
| 8,924,249 B2* | 12/2014 | Tropper ............... A61B 5/1118 455/414.1 |
| 9,141,961 B2 | 9/2015 | Rajan et al. |
| 2001/0014870 A1 | 8/2001 | Saito et al. |
| 2001/0042010 A1 | 11/2001 | Hassell |
| 2002/0002504 A1 | 1/2002 | Engel et al. |
| 2002/0004783 A1 | 1/2002 | Paltenghe et al. |
| 2002/0010627 A1 | 1/2002 | Lerat |
| 2002/0046084 A1 | 4/2002 | Steele et al. |
| 2002/0065713 A1 | 5/2002 | Awada et al. |
| 2002/0091569 A1 | 7/2002 | Kitaura et al. |
| 2002/0091571 A1 | 7/2002 | Thomas et al. |
| 2002/0107738 A1 | 8/2002 | Beach et al. |
| 2002/0111140 A1 | 8/2002 | Kim |
| 2002/0111907 A1 | 8/2002 | Ling |
| 2002/0116271 A1 | 8/2002 | Mankoff |
| 2002/0117544 A1 | 8/2002 | Wolf et al. |
| 2002/0128903 A1 | 9/2002 | Kernahan |
| 2002/0138345 A1 | 9/2002 | Dickson et al. |
| 2002/0138346 A1 | 9/2002 | Kodaka et al. |
| 2002/0161631 A1 | 10/2002 | Banerjee et al. |
| 2002/0169665 A1 | 11/2002 | Hughes et al. |
| 2002/0169668 A1 | 11/2002 | Bank et al. |
| 2002/0169892 A1 | 11/2002 | Miyaoku et al. |
| 2002/0178060 A1 | 11/2002 | Sheehan |
| 2002/0194303 A1 | 12/2002 | Suila et al. |
| 2003/0004808 A1 | 1/2003 | Elhaoussine et al. |
| 2003/0004821 A1 | 1/2003 | Dutta et al. |
| 2003/0014306 A1 | 1/2003 | Marko |
| 2003/0055726 A1 | 3/2003 | Sohya et al. |
| 2003/0074259 A1 | 4/2003 | Slyman et al. |
| 2003/0093283 A1 | 5/2003 | Morsa |
| 2003/0093314 A1 | 5/2003 | Leung et al. |
| 2003/0108009 A1 | 6/2003 | Petersen |
| 2003/0115152 A1 | 6/2003 | Flaherty |
| 2003/0117635 A1 | 6/2003 | Roberts |
| 2003/0158796 A1 | 8/2003 | Balent |
| 2003/0195806 A1 | 10/2003 | Willman et al. |
| 2003/0217153 A1 | 11/2003 | Rao et al. |
| 2003/0233190 A1 | 12/2003 | Jones |
| 2004/0054575 A1 | 3/2004 | Marshall |
| 2004/0054592 A1 | 3/2004 | Hernblad |
| 2004/0054732 A1 | 3/2004 | Carter et al. |
| 2004/0064351 A1 | 4/2004 | Mikurak |
| 2004/0117250 A1 | 6/2004 | Lubow et al. |
| 2004/0137886 A1* | 7/2004 | Ross ..................... G06Q 30/02 455/414.1 |
| 2004/0143500 A1 | 7/2004 | Lopez et al. |
| 2004/0156326 A1 | 8/2004 | Chithambaram |
| 2004/0158490 A1 | 8/2004 | Sakamura et al. |
| 2004/0158492 A1 | 8/2004 | Lopez et al. |
| 2004/0177003 A1 | 9/2004 | Liao et al. |
| 2004/0203963 A1 | 10/2004 | Shivaram et al. |
| 2004/0218574 A1 | 11/2004 | Sata et al. |
| 2004/0222302 A1 | 11/2004 | Matsumori |
| 2004/0233621 A1 | 11/2004 | Maeoka et al. |
| 2004/0240565 A1 | 12/2004 | Santhoff et al. |
| 2004/0243519 A1 | 12/2004 | Perttila et al. |
| 2004/0254836 A1 | 12/2004 | Emoke et al. |
| 2005/0004840 A1 | 1/2005 | Wanninger |
| 2005/0027984 A1 | 2/2005 | Saito et al. |
| 2005/0038574 A1 | 2/2005 | Gila et al. |
| 2005/0040230 A1 | 2/2005 | Swartz et al. |
| 2005/0045718 A1 | 3/2005 | Bortolin et al. |
| 2005/0114213 A1 | 5/2005 | Smith et al. |
| 2005/0131761 A1* | 6/2005 | Trika ..................... G06Q 30/02 705/14.26 |
| 2005/0132234 A1 | 6/2005 | Dawson |
| 2005/0135304 A1 | 6/2005 | Wentink et al. |
| 2005/0138576 A1 | 6/2005 | Baumert et al. |
| 2005/0184145 A1 | 8/2005 | Law et al. |
| 2005/0200671 A1 | 9/2005 | Mistry et al. |
| 2005/0204152 A1 | 9/2005 | Breitbach |
| 2005/0230473 A1 | 10/2005 | Fajkowski |
| 2005/0237270 A1 | 10/2005 | Adams et al. |
| 2006/0003776 A1 | 1/2006 | Natori et al. |
| 2006/0014532 A1 | 1/2006 | Seligmann et al. |
| 2006/0015404 A1 | 1/2006 | Tran |
| 2006/0015405 A1 | 1/2006 | Bala et al. |
| 2006/0026070 A1 | 2/2006 | Sun |
| 2006/0030341 A1 | 2/2006 | Pham |
| 2006/0068822 A1 | 3/2006 | Kalhan |
| 2006/0073851 A1 | 4/2006 | Colando et al. |
| 2006/0074784 A1 | 4/2006 | Brown |
| 2006/0111967 A1 | 5/2006 | Forbes |
| 2006/0130100 A1 | 6/2006 | Pentland |
| 2006/0143080 A1 | 6/2006 | Garg et al. |
| 2006/0177030 A1 | 8/2006 | Rajagopalan et al. |
| 2006/0178932 A1 | 8/2006 | Lang |
| 2006/0180664 A1 | 8/2006 | Barrett et al. |
| 2006/0190331 A1 | 8/2006 | Tollinger et al. |
| 2006/0194569 A1 | 8/2006 | Hsueh |
| 2006/0293968 A1 | 12/2006 | Brice et al. |
| 2007/0017259 A1 | 1/2007 | Cho et al. |
| 2007/0043626 A1 | 2/2007 | Duvall et al. |
| 2007/0057051 A1 | 3/2007 | Bortolin et al. |
| 2007/0061208 A1 | 3/2007 | Goldman et al. |
| 2007/0061302 A1 | 3/2007 | Ramer et al. |
| 2007/0066341 A1* | 3/2007 | Silverbrook ............... B41J 3/36 455/550.1 |
| 2007/0087732 A1 | 4/2007 | Hsueh |
| 2007/0112951 A1 | 5/2007 | Fung et al. |
| 2007/0124209 A1 | 5/2007 | Walker et al. |
| 2007/0131759 A1 | 6/2007 | Cox et al. |
| 2007/0136657 A1 | 6/2007 | Blumenthal et al. |
| 2007/0136775 A1 | 6/2007 | MacKay et al. |

(56) References Cited

U.S. PATENT DOCUMENTS

| | | |
|---|---|---|
| 2007/0138270 A1 | 6/2007 | Reblin |
| 2007/0150339 A1 | 6/2007 | Retter et al. |
| 2007/0156513 A1 | 7/2007 | Mastrianni et al. |
| 2007/0173266 A1 | 7/2007 | Barnes, Jr. et al. |
| 2007/0174116 A1 | 7/2007 | Keith et al. |
| 2007/0182546 A1 | 8/2007 | Virk et al. |
| 2007/0200671 A1 | 8/2007 | Kelley et al. |
| 2007/0203792 A1 | 8/2007 | Rao |
| 2007/0241189 A1 | 10/2007 | Slavin et al. |
| 2007/0249288 A1 | 10/2007 | Moallemi et al. |
| 2007/0259690 A1 | 11/2007 | Julian et al. |
| 2007/0270129 A1 | 11/2007 | Luo |
| 2007/0276537 A1 | 11/2007 | Walker et al. |
| 2007/0281692 A1* | 12/2007 | Bucher ............ G06Q 30/02 455/435.1 |
| 2008/0040229 A1 | 2/2008 | Gholston |
| 2008/0052169 A1 | 2/2008 | O'Shea et al. |
| 2008/0062940 A1* | 3/2008 | Othmer ............ H04W 4/02 370/338 |
| 2008/0065488 A1 | 3/2008 | Schwagmann et al. |
| 2008/0072066 A1 | 3/2008 | Vogler et al. |
| 2008/0074264 A1 | 3/2008 | Sharpe et al. |
| 2008/0077484 A1 | 3/2008 | Main et al. |
| 2008/0120186 A1 | 5/2008 | Jokinen et al. |
| 2008/0132163 A1* | 6/2008 | Ilan ............ G06Q 30/02 455/3.06 |
| 2008/0133349 A1 | 6/2008 | Nazer et al. |
| 2008/0133366 A1 | 6/2008 | Evans et al. |
| 2008/0154714 A1 | 6/2008 | Liu et al. |
| 2008/0154827 A1 | 6/2008 | Connors |
| 2008/0167991 A1 | 7/2008 | Carlson et al. |
| 2008/0182563 A1* | 7/2008 | Wugofski ............ G06Q 10/10 455/414.2 |
| 2008/0189170 A1 | 8/2008 | Ramachandra |
| 2008/0207327 A1 | 8/2008 | Van Luchene et al. |
| 2008/0208688 A1 | 8/2008 | Byerley et al. |
| 2008/0215430 A1 | 9/2008 | Ellis et al. |
| 2008/0221984 A1 | 9/2008 | Abhyanker |
| 2008/0238615 A1 | 10/2008 | Carpenter |
| 2008/0243619 A1* | 10/2008 | Sharman ............ G06Q 30/02 705/14.54 |
| 2008/0262928 A1 | 10/2008 | Michaelis |
| 2008/0270231 A1 | 10/2008 | Li et al. |
| 2008/0300970 A1 | 12/2008 | Scheibe |
| 2008/0300984 A1 | 12/2008 | Li |
| 2009/0030779 A1 | 1/2009 | Tollinger et al. |
| 2009/0061884 A1 | 3/2009 | Rajan et al. |
| 2009/0076911 A1 | 3/2009 | Vo et al. |
| 2009/0076912 A1 | 3/2009 | Rajan et al. |
| 2009/0088182 A1 | 4/2009 | Piersol et al. |
| 2009/0098903 A1 | 4/2009 | Donaldson et al. |
| 2009/0108064 A1 | 4/2009 | Fernandes et al. |
| 2009/0164309 A1 | 6/2009 | Mgrdechian et al. |
| 2009/0178144 A1 | 7/2009 | Redlich et al. |
| 2009/0233575 A1 | 9/2009 | Morrison |
| 2010/0066498 A1 | 3/2010 | Fenton |
| 2010/0138303 A1 | 6/2010 | Preston et al. |
| 2010/0153205 A1 | 6/2010 | Retter et al. |
| 2010/0174615 A1 | 7/2010 | Weaver |
| 2010/0205043 A1 | 8/2010 | Edwards |
| 2010/0241574 A1 | 9/2010 | Salazar |
| 2010/0257020 A1 | 10/2010 | Bryant et al. |
| 2010/0280960 A1 | 11/2010 | Ziotopoulos et al. |
| 2010/0289640 A1 | 11/2010 | Annamalai |
| 2010/0299224 A1 | 11/2010 | Borom et al. |
| 2011/0028160 A1 | 2/2011 | Roeding et al. |
| 2011/0086617 A1* | 4/2011 | Trioano ............ G06Q 30/02 455/412.1 |
| 2011/0119132 A1 | 5/2011 | Morton et al. |
| 2011/0215138 A1 | 9/2011 | Crum |
| 2011/0230233 A1* | 9/2011 | Silverbrook ............ B41J 3/445 455/556.1 |
| 2011/0250901 A1 | 10/2011 | Grainger et al. |
| 2011/0276385 A1 | 11/2011 | Keller |
| 2012/0239500 A1 | 9/2012 | Monahan |
| 2013/0006773 A1 | 1/2013 | Lutnick et al. |
| 2013/0030915 A1 | 1/2013 | Statler et al. |
| 2013/0085827 A1 | 4/2013 | Jenkins |
| 2013/0144703 A1 | 6/2013 | Vannoller et al. |
| 2015/0017951 A1 | 1/2015 | Agrawal et al. |
| 2015/0024689 A1 | 1/2015 | Agrawal |
| 2016/0012489 A1 | 1/2016 | Rajan et al. |

FOREIGN PATENT DOCUMENTS

| | | |
|---|---|---|
| CN | 1672382 | 9/2005 |
| CN | 1694122 A | 11/2005 |
| CN | 1716223 A | 1/2006 |
| CN | 1799061 A | 7/2006 |
| CN | 1879121 A | 12/2006 |
| CN | 1968167 A | 5/2007 |
| CN | 101384031 A | 3/2009 |
| CN | 101731017 A | 6/2010 |
| EP | 1758308 A1 | 2/2007 |
| EP | 1926335 A1 | 5/2008 |
| EP | 2184927 A1 | 5/2010 |
| JP | 11353555 A | 12/1999 |
| JP | 2000275328 A | 10/2000 |
| JP | 2001034658 A | 2/2001 |
| JP | 2001145785 A | 5/2001 |
| JP | 2001216449 A | 8/2001 |
| JP | 2001223712 A | 8/2001 |
| JP | 2001325507 A | 11/2001 |
| JP | 2002073666 A | 3/2002 |
| JP | 2002074131 A | 3/2002 |
| JP | 2002109237 A | 4/2002 |
| JP | 2002132886 A | 5/2002 |
| JP | 2002149945 A | 5/2002 |
| JP | 2002150102 A | 5/2002 |
| JP | 2002525641 A | 8/2002 |
| JP | 2002251555 A | 9/2002 |
| JP | 2002279274 A | 9/2002 |
| JP | 2002291047 | 10/2002 |
| JP | 2002374261 A | 12/2002 |
| JP | 2003006543 A | 1/2003 |
| JP | 2003023367 A | 1/2003 |
| JP | 2003051771 | 2/2003 |
| JP | 2003067606 A | 3/2003 |
| JP | 2003115001 A | 4/2003 |
| JP | 2003187140 A | 7/2003 |
| JP | 2003208381 A | 7/2003 |
| JP | 2003256705 A | 9/2003 |
| JP | 2003263582 A | 9/2003 |
| JP | 2004094543 A | 3/2004 |
| JP | 2004516989 A | 6/2004 |
| JP | 2004220522 A | 8/2004 |
| JP | 2004236166 A | 8/2004 |
| JP | 2004248215 A | 9/2004 |
| JP | 2004272463 A | 9/2004 |
| JP | 2004326303 A | 11/2004 |
| JP | 2004328542 A | 11/2004 |
| JP | 2004334885 A | 11/2004 |
| JP | 2004362470 A | 12/2004 |
| JP | 2005011318 A | 1/2005 |
| JP | 2005020350 A | 1/2005 |
| JP | 2005045756 A | 2/2005 |
| JP | 2005078173 A | 3/2005 |
| JP | 2005128903 A | 5/2005 |
| JP | 2005128965 A | 5/2005 |
| JP | 2005141686 A | 6/2005 |
| JP | 2005209114 A | 8/2005 |
| JP | 2005528016 A | 9/2005 |
| JP | 2005533316 A | 11/2005 |
| JP | 2005534260 A | 11/2005 |
| JP | 2006011806 A | 1/2006 |
| JP | 2006018511 A | 1/2006 |
| JP | 2006018824 A | 1/2006 |
| JP | 2006020004 A | 1/2006 |
| JP | 2006059219 A | 3/2006 |
| JP | 2006091355 A | 4/2006 |
| JP | 2006129000 A | 5/2006 |
| JP | 2006139431 A | 6/2006 |
| JP | 2006197458 | 7/2006 |

(56) References Cited

FOREIGN PATENT DOCUMENTS

| | | |
|---|---|---|
| JP | 2006227901 A | 8/2006 |
| JP | 2006246433 A | 9/2006 |
| JP | 2006295249 A | 10/2006 |
| JP | 2006318125 A | 11/2006 |
| JP | 2007025854 A | 2/2007 |
| JP | 2007502087 A | 2/2007 |
| JP | 2007072906 A | 3/2007 |
| JP | 2007133461 A | 5/2007 |
| JP | 2007201851 A | 8/2007 |
| JP | 2007213276 A | 8/2007 |
| JP | 2008225540 A | 9/2008 |
| JP | 2008293123 A | 12/2008 |
| JP | 2009104350 A | 5/2009 |
| JP | 2009188922 A | 8/2009 |
| JP | 2010515168 A | 5/2010 |
| JP | 2013500538 A | 1/2013 |
| KR | 1020020068945 | 8/2002 |
| KR | 20020096946 A | 12/2002 |
| KR | 20030011744 A | 2/2003 |
| KR | 20030018741 A | 3/2003 |
| KR | 20040020309 A | 3/2004 |
| KR | 20040069122 A | 8/2004 |
| KR | 100512362 B1 | 9/2005 |
| KR | 20060014942 A | 2/2006 |
| KR | 20060018235 A | 2/2006 |
| KR | 20060064222 A | 6/2006 |
| KR | 20060124430 A | 12/2006 |
| KR | 20070016301 | 2/2007 |
| RU | 2150790 C1 | 6/2000 |
| RU | 2267156 C2 | 12/2005 |
| RU | 20050100782 | 2/2006 |
| RU | 2301450 C2 | 6/2007 |
| TW | I228364 | 2/2005 |
| TW | I252324 | 4/2006 |
| TW | I252628 | 4/2006 |
| TW | I252639 | 4/2006 |
| TW | I252671 | 4/2006 |
| WO | WO-9613920 A1 | 5/1996 |
| WO | WO-0175710 A1 | 10/2001 |
| WO | WO-0178423 A1 | 10/2001 |
| WO | WO-0221478 A2 | 3/2002 |
| WO | WO-0225823 | 3/2002 |
| WO | WO-0250732 A1 | 6/2002 |
| WO | WO-02054353 A1 | 7/2002 |
| WO | WO-03107289 A1 | 12/2003 |
| WO | WO-2004008276 A2 | 1/2004 |
| WO | WO-2004014037 A1 | 2/2004 |
| WO | WO-2004027662 A1 | 4/2004 |
| WO | WO-2004107230 A1 | 12/2004 |
| WO | WO-2005045455 A2 | 5/2005 |
| WO | WO-2005064515 A1 | 7/2005 |
| WO | WO-2005110208 A1 | 11/2005 |
| WO | WO-2005122483 A1 | 12/2005 |
| WO | WO-2006030341 A1 | 3/2006 |
| WO | WO-2006092772 A1 | 9/2006 |
| WO | WO-2007026745 A1 | 3/2007 |
| WO | WO-2008027965 | 3/2008 |
| WO | WO-2008146576 A1 | 12/2008 |
| WO | WO-2008157804 | 12/2008 |
| WO | WO-2008157806 A2 | 12/2008 |
| WO | WO-2009140438 A1 | 11/2009 |
| WO | WO-2010096617 A2 | 8/2010 |
| WO | WO-2011014292 A1 | 2/2011 |

OTHER PUBLICATIONS

Blundo, C. et al.: "Secure E-Coupons," Electronic Commerce Research, vol. 5, No. 1, pp. 117-139, Kluwer, Dordrecth, NL, (Jan. 1, 2005), XP002380651, ISSN: 1389-5753, Section 8.4.
"Case Studies judgment on business related inventions" http://www.jpo.go.jp/tetuzuki/t_tokkyo/bijinesu/biz_pat_case.htm, Apr. 2003.
Co-pending U.S. Appl. No. 13/048,060, filed Mar. 15, 2011.
Co-pending U.S. Appl. No. 13/363,580, filed Feb. 1, 2012.
"Digital Watermarking Alliance", Oct. 19, 2006, 8 Pages, Retrieved from the Internet: URL: http://www.digitalwatermarkingalliance.org/faqs.asp [retrieved on Jul. 21, 2014].
Itao T., "Relationship Mechanism for Dynamic and User Preference-Aware Service Creation", Journal of the Information Processing Society of Japan, Japan, IPSJ, Mar. 15, 2003, vol. 44, No. 3, pp. 812-825.
Kirovski D., et al., "Spread Spectrum Watermarking of Audio Signals", IEEE Transactions on Signal Processing, vol. 51, No. 4, pp. 1020-1033, Apr. 2003.
Lester, J et al., ""Are You With Me ?"—Using Accelerometers to Determine if Two Devices are Carried by the Same Person", LNCS, Pervasive Computing, Apr. 2004, vol. 3001, pp. 33-50.
Okazaki, "Eight Methods for Capitalizing on Access Log Analysis, which are Essential to SEO, Marketing and Redesign", Web Creators, NdN Corporation, Japan, Mar. 1, 2005, vol. 39, pp. 148-155.
Roumeliotis, T., "Five geofencing ideas for mobile marketing from brands and retailers," Mobile Commerce Daily, Jul. 16, 2010, 2 pages, Retrieved from http://www.mobilecommercedaily.com/five-geofencing-ideas-for-mobile-marketing-from-brands-and-retailers .

* cited by examiner

DYNAMIC ELECTRONIC COUPON FOR A MOBILE ENVIRONMENT

CLAIM OF PRIORITY UNDER 35 U.S.C. §119

The present Application for Patent is a continuation of U.S. application Ser. No. 12/142,159, entitled "DYNAMIC ELECTRONIC COUPON FOR A MOBILE ENVIRONMENT," filed Jun. 19, 2008, which claims priority to Provisional Application No. 60/945,098, entitled "DYNAMIC COUPON SYSTEM," filed Jun. 20, 2007, each of which is assigned to the assignee hereof and hereby expressly incorporated by reference herein.

REFERENCE TO CO-PENDING APPLICATIONS FOR PATENT

The present Application for Patent is related to U.S. patent application Ser. No. 12/124,824, entitled "MOBILE COUPONS UTILIZING PEER TO PEER RANGING," filed May 21, 2008, assigned to the assignee hereof and expressly incorporated by reference herein, which in turn claims priority to Provisional Application No. 60/945,120, entitled "METHOD AND APPARATUS FOR DELIVERING COUPONS BASED ON RANGING," filed Jun. 20, 2007; and U.S. patent application Ser. No. 12/142,597, entitled "MANAGEMENT OF DYNAMIC ELECTRONIC COUPONS," filed Jun. 19, 2008, assigned to the assignee hereof and expressly incorporated by reference herein, which in turn claims priority to Provisional Application No. 60/945,100, entitled "COUPON WALLET SYSTEM," filed Jun. 20, 2007.

BACKGROUND

The following relates generally to a mobile operating environment, and more particularly to providing dynamic mobile coupons in such a mobile operating environment.

In recent years, a variety of advancements has occurred in cellular communication technology and cellular communication devices. Some of the advancements, such as integration of camera and video recording technology onto such devices, incorporation of e-mail and short messaging services into mobile communication, and the like, involve software and/or hardware applications. These applications have added increased flexibility, processing power, communication capabilities, and so forth, to already popular communication devices (e.g., cellular telephones). As a result, such devices have become more popular in a consumer marketplace, motivating larger numbers of consumers to purchase such devices, or to upgrade to devices that include new applications and technologies.

As larger numbers of consumers own and utilize mobile devices, business mechanisms traditionally limited to personal, radio, television or landline telephone contact are expanding into the mobile environment. For instance, as the Internet becomes increasingly accessible via mobile communication devices, e-mail and web browsing applications are utilized with mobile devices. Further, electronic commerce is conducted by way of such devices as well. For instance, secure web applications can provide an interface for conducting online commercial transactions with a web browsing device. Credit card, debit card, bank transfer and like payments can be facilitated utilizing secure web applications by way of such device.

In addition to the foregoing, other commercial mechanisms have also been incorporated into mobile devices and mobile communication environments. For instance, electronic coupons stored on mobile devices can be utilized to replace paper coupons. A commercial entity can generate coupons and distribute them to mobile devices, which can in turn facilitate redemption of coupons in conjunction with commercial transactions. As electronic files, such coupons have more flexibility than traditional paper coupons. For instance, a paper coupon is more readily misplaced as compared with an electronic coupon stored on a mobile device. Further, an electronic coupon can incorporate various security measures to mitigate duplication and other unauthorized uses. Accordingly, many benefits accrue upon introduction of electronic coupons in a mobile operating environment.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Disclosed herein are dynamic electronic coupons configured for a mobile device and having a variable characteristic, such as commercial value, in conjunction with a commercial transaction. Such electronic coupons, or dynamic mobile coupons (DMCs) as configured for a mobile device, can be delivered to the mobile device from a voice and/or data service provider, retail entity, third party supplier, or the like. The variable characteristic of the DMC is established based at least in part on a factor pertinent to a recipient mobile device, a user of the device, a coupon profile provided by a sponsor of the coupon, etc.

A variable characteristic of a DMC can be determined prior to transmitting the DMC to a recipient device. Alternatively, or in addition, the variable characteristic of the DMC can be determined after transmission of the DMC to the recipient device. Further, in at least some aspects, a determined characteristic can be dynamically updated based on additional circumstances and/or criteria. Upon redemption of the DMC, the characteristic is fixed and at least an aspect of the characteristic is applied to a transaction. Data pertaining to the transaction and the DMC can be sent to a clearinghouse entity that facilitates payment or reimbursement, where suitable, to a retail entity that redeems the coupon (e.g., a retail store). Therefore, the subject disclosure describes a DMC that facilitates a rich and flexible mechanism to generate purchasing incentive for consumers in a mobile environment.

In one or more aspects, disclosed is a method of providing an electronic coupon in a mobile operating environment. The method comprises associating a DMC with a target mobile device wherein the DMC has at least one variable coupon characteristic. Further, the method can comprise establishing an initial parameter for variable coupon characteristic(s) based on a determinable circumstance pertinent to the target mobile device or a user account of/associated with the device. In some aspects, the method can comprise communicatively coupling with a clearinghouse in conjunction with applying the value of the DMC to a transaction.

In some aspects, described is an apparatus that facilitates distribution, redemption, or valuation of an electronic coupon in a mobile environment. The apparatus can comprise a coupon module that associates a DMC with a target mobile device, wherein the DMC has at least one variable coupon characteristic. The apparatus can further comprise a valuation module that establishes an initial parameter of the variable coupon characteristic based on a determinable circumstance pertinent to the target mobile device or a user account of/associated with the device. The apparatus can also include memory that stores at least the coupon module and the valuation module to facilitate DMC distribution by the apparatus, and a processor that executes the modules. Optionally, the apparatus can include a wired and/or wireless interface that sends the DMC or an indication thereof to the selected mobile device.

In accordance with one or more additional aspects, disclosed is a DMC distribution device. The DMC distribution device can comprise a first module configured to associate a DMC with a target mobile device, wherein the DMC has at least one variable coupon characteristic. Further, the device can comprise a third module configured to establish an initial parameter for the variable coupon characteristic based on a determinable circumstance pertinent to the target mobile device or a user account of/associated with the device. The distribution device can optionally include a fourth module configured to communicatively couple with a clearinghouse in conjunction with applying the value of the DMC to a transaction.

According to a further aspect, described is an apparatus configured to provide an electronic coupon in a mobile operating environment. The apparatus can comprise means for associating a DMC with a target mobile device, wherein the DMC has at least one variable coupon characteristic. Further, the apparatus can comprise means for establishing an initial parameter of the variable coupon characteristic based on a determinable circumstance pertinent to the target mobile device or a user account of/associated with the device.

In at least one additional aspect, disclosed is a computer program product for communication between remote devices. The computer program product comprises a computer-readable medium containing instructions executable by at least one computer to associate a DMC with a target mobile device, wherein the DMC has at least one variable coupon characteristic. Moreover, the instructions can be executable by the at least one computer to establish an initial parameter of the variable coupon characteristic based on a determinable circumstance pertinent to the target mobile device or a user account of/associated with the device.

According to one or more other aspects, provided is a method of communication between remote devices. The method can comprise obtaining data from a device; the data comprises a DMC or an indication of the DMC and further comprises at least one variable coupon characteristic. Further, the method can comprise obtaining a factor relevant to establishing an initial parameter for the variable coupon characteristic and collecting data pertinent to the factor to facilitate establishing the initial parameter.

In additional aspects, disclosed is an apparatus that facilitates implementing a dynamic electronic coupon in a mobile environment. The apparatus comprises a transceiver that obtains a DMC having at least one variable coupon characteristic, or an indication of such DMC and characteristic, and at least one factor relevant to establishing an initial parameter for the variable coupon characteristic. The apparatus can further comprise memory that stores the DMC or factor(s) and a valuation engine that collects data pertinent to the at least one factor to facilitate establishing the initial parameter for the variable coupon characteristic.

According to a further aspect, provided is a mobile device. The mobile device can comprise a transceiver configured for wired and/or wireless data exchange with a remote device. The mobile device can further include a first module configured to obtain a DMC or an indication of the DMC from the remote device, wherein the DMC has at least one variable coupon characteristic. Further, the mobile device can comprise a second module configured to obtain at least one factor relevant to establishing an initial parameter for the variable coupon characteristic and a third module configured to collect data pertinent to the factor(s) to facilitate establishing of the initial parameter.

According to an additional aspect, provided is an apparatus configured for communication with a remote device. The apparatus can comprise means for obtaining a DMC or an indication of the DMC from a device, wherein the DMC has at least one variable coupon characteristic. Moreover, the apparatus can comprise means for obtaining at least one factor relevant to establishing an initial parameter for the variable coupon characteristic and means for collecting data pertinent to the at least one factor to facilitate establishing the initial parameter.

In accordance with still another aspect, disclosed is a computer program product configured for communication with a remote device. The computer program produce can comprise a computer-readable medium containing instructions executable to obtain a DMC or an indication of the DMC from a device, wherein the DMC has at least one variable coupon characteristic. The instructions can be further executable to obtain at least one factor relevant to establishing an initial parameter for the variable coupon characteristic and to collect data pertinent to the at least one factor to facilitate establishing the initial parameter.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects can be employed and the described aspects are intended to include all such aspects and their equivalents.

DETAILED DESCRIPTION

Figure 1:
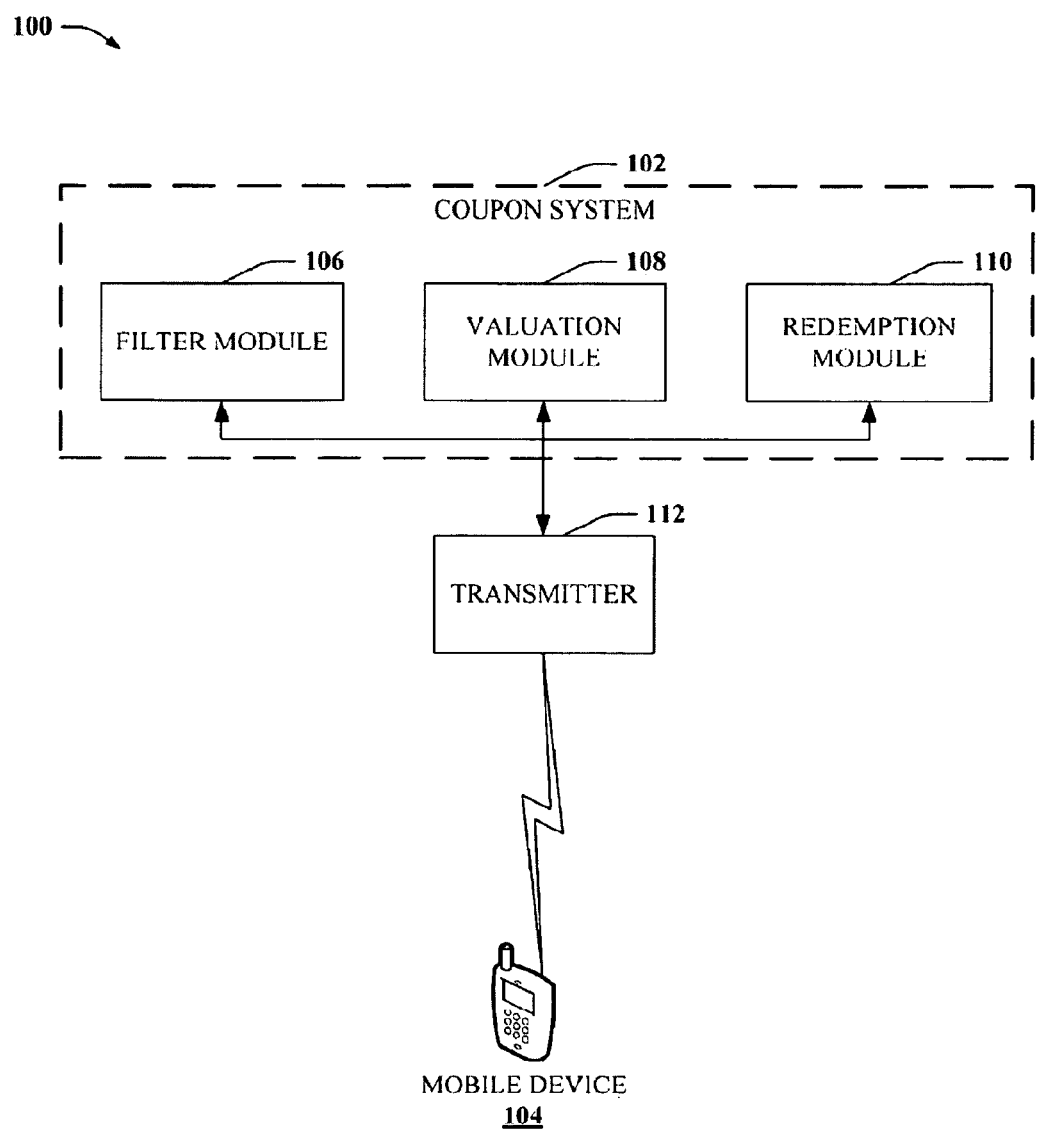
FIG. 1 depicts a block diagram of an example system that provides variable value dynamic mobile coupons (DMCs) in a mobile operating environment.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

The subject disclosure provides for variable characteristic electronic coupons for a mobile environment. The electronic coupons can be distributed to a particular mobile device, selected based on predetermined criteria (e.g., location, time, identity, prior mobile device-based commercial transactions, features/capabilities of the mobile device, and so on). In addition, the electronic coupons can provide some value in conjunction with a commercial transaction. Particularly, the value is variable, in that it can be undetermined or adjustable at a given point in time. By adjusting the variable characteristic (e.g., a redeemable value) of an electronic coupon, a consumer can be given a greater or lesser incentive to conduct the transaction at a given point in time or based on a given circumstance.

In addition to the foregoing, mobile coupons (e.g., an electronic coupon configured for, distributed to, stored on and/or redeemed utilizing a mobile device) can be distributed based on information pertinent to a mobile device, user accounts maintained on such devices (e.g., mobile coupon account), interaction with users in a user 'buddy list', and the like. The nature of mobile devices (e.g., cell phone, smart phone, PDA, laptop, multi-mode phone, and so on) involves dynamic, yet generally determinable characteristics. For instance, a location of the mobile device can change over time as a user carries the mobile device, transports the mobile device in a vehicle, etc. Strength of signals emitted by a mobile device (e.g., radio frequency [RF] signals) can vary over time as well, as location, transmission strength, battery power, or like factors associated with the mobile device change. Accordingly, a wireless device communicatively coupled with a mobile device can determine various dynamic characteristics of such device based on signals received or transmitted to such mobile device.

Because mobile devices involve dynamic characteristics, directed marketing involving a mobile device can be conducted based on contemporaneous conditions of such device. For instance, a mobile coupon can be distributed to the mobile device based on location of the mobile device, capabilities/functions of the mobile device, or time of day, or a combination of these or like factors. It should also be appreciated that a mobile coupon can have dynamic or variable coupon characteristics as well. In some aspects, an attribute of the coupon can depend on a dynamic characteristic of the mobile device. For instance, a redeemable value of a DMC can be based on a location of the mobile device. The foregoing example describes a mobile coupon with a dynamic characteristic and provides at least one example of a dynamic mobile coupon (DMC).

As a particular example of the foregoing, a redeemable value of a DMC can provide a first monetary value if the mobile device is at a first location and a second monetary value if the mobile device is not at the first location (or, e.g., is not within a threshold distance of the first location). In some aspects, the redeemable value of the DMC can be independent of characteristics associated with the mobile device. As another example, the redeemable value could provide the first monetary value between 9 am and 12 noon, and the second monetary value between 12 noon and 5 pm, regardless of location of the mobile device. As a third example, various suitable circumstances can be combined to determine the redeemable value. For instance, the DMC can provide the first monetary value if the mobile device is at the first location between 9:00 am and 12:00 noon, and provide the second monetary value in all other circumstances. It should be appreciated that various suitable algorithms (e.g., Boolean logic) are contemplated for establishing a value, or other variable coupon characteristic, of a DMC.

By determining changing aspects of mobile devices, DMCs can be distributed to such devices based on user profile(s) or device characteristics. In addition, because mobile coupons are electronic files, such as audio and/or video media files, mobile coupons can be rich multi-dimensional media, graphical files, programs, and the like. For instance, a DMC can be displayed and presented on a graphical display in three dimensions (simulated or actual), with various layers, animations, video, audio, sections, fonts, drawings, figures, and the like. Further, additional applications can be linked to the DMC. As an example, product, manufacturer, distributor, and/or retail electronic media advertisements can be coupled to the DMC. Such media can utilize graphical animation to provide a rich and detailed user experience. In addition, characteristics of the DMC (e.g., redeemable value) can be adjusted based on value-added incentives included with the DMC, such as a video advertisement.

According to one or more other aspects, DMCs can be stored and organized on a mobile device for user convenience. The DMCs can be referenced based on suitable indicia, such as supplier, product, retail entity, and the like. DMCs can also be categorized as a function of concurrent value. In addition, rules defining changes to redeemable value can be displayed, where desired. In some aspects, rules for defining value or value adjustment can be hidden or not included with the DMC. Accordingly, some DMCs can adjust or determine redeemable value based on factors undisclosed to a consumer. As described, the disclosure presents a rich and flexible environment for distributing, valuing, and redeeming mobile coupons in a mobile communication environment.

The disclosure herein facilitates many commercial benefits, including providing variable purchasing incentive based at least in part on dynamic factors associated with a mobile device, a stored profile of a user, manufacturer, coupon distributor, etc., a dynamic commercial influence associated with a store or product (e.g., current inventory), and so on. Thus, purchasing incentive provided through coupons can be dynamically tailored to fit the desires of a coupon sponsor based on fluctuating consumer and market conditions.

Various aspects of the disclosure are described below. It should be apparent that the teaching herein can be embodied in a wide variety of forms and that any specific structure and/or function disclosed herein is merely representative. Based on the teachings herein one skilled in the art should appreciate that an aspect disclosed herein can be implemented independently of other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the methods, devices, systems, and apparatuses described herein are described in the context of providing dynamic mobile coupons in a mobile communication environment. One skilled in the art should appreciate that similar techniques could apply to other communication environments as well.

As used in this disclosure, the terms "component," "system," "module," and the like are intended to refer to a computer-related entity, either hardware, software, software in execution, firmware, middle ware, microcode, and/or any combination thereof. For example, a component can be, but is not limited to being, a process running on a processor, a processor, an object, an executable, a thread of execution, a program, and/or a computer. One or more components can reside within a process and/or thread of execution and a component can be localized on one computer and/or distributed between two or more computers. Further, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein can be rearranged and/or complemented by additional components in order to facilitate achieving the various aspects, goals, advantages, etc., described with regard thereto, and are not limited to the precise configurations set forth in a given figure, as will be appreciated by one skilled in the art.

Additionally, the various illustrative logics, logical blocks, modules, and circuits described in connection with the aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other suitable configuration. Additionally, at least one processor can comprise one or more modules operable to perform one or more of the steps and/or actions described herein.

Furthermore, various aspects are described herein in connection with a mobile communication device (or, e.g., a mobile device). A mobile communication device can also be called a system, a subscriber unit, a subscriber station, mobile station, mobile, mobile device, cellular device, multi-mode device, remote station, remote terminal, access terminal, user terminal, user agent, a user device, or user equipment, or the like. A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

Moreover, various aspects or features described herein can be implemented as a method, apparatus, or article of manufacture using standard programming and/or engineering techniques. Further, the steps and/or actions of a method or algorithm described in connection with the aspects disclosed herein can be embodied directly in hardware, in a software module executed by a processor, or in a combination of the two. Additionally, in some aspects, the steps and/or actions of a method or algorithm can reside as at least one or any combination or set of codes and/or instructions on a machine-readable medium and/or computer readable medium, which can be incorporated into a computer program product. Further, the term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.) smart cards, and flash memory devices (e.g., card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

In addition to the foregoing, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. Furthermore, as used in this application and the appended claims, the term "or" is intended to mean an inclusive "or" rather than an exclusive "or." That is, unless specified otherwise, or clear from context, "X employs A or B" is intended to mean any of the natural inclusive permutations. That is, in this example, X could employ A, or X could employ B, or X could employ both A and B, and thus the statement "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of a system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the drawings, FIG. 1 depicts a block diagram of an example system 100 that can distribute and valuate mobile coupons based on dynamic and/or determinable criteria. System 100 includes a coupon system 102 coupled with a mobile handset 104 via a wired and/or wireless data interface (e.g., a wireless transceiver 112). The coupon system 102 can generate and/or distribute a DMC to the mobile handset 104 by employing the data interface (112). In addition, coupon system 102 can establish an initial parameter of a variable coupon characteristic (e.g., redeemable value, re-distribution status, a multi-media feature) of the DMC based on a determinable circumstance(s) pertinent to the mobile device 104. Accordingly, the DMC can provide customized purchasing incentive tailored to the mobile device 104 by adjusting a redeemable value of the DMC or providing additional value based on data pertinent to the mobile device 104.

As utilized herein, a DMC refers to an electronic application, program, file, or the like, that can be redeemed for economic value in conjunction with a transaction, and has at least one characteristic that varies based on a determinable circumstance. In some aspects, the DMC can be a stand-alone application transmitted to an external entity (e.g., mobile device 104). In other aspects, the DMC can be retained at a distribution device (e.g., coupon system 102), and information identifying, describing and/or pertinent to redeeming the DMC can be transmitted to the external entity (104). In still other aspects, a DMC can be copied and shared between the distributor (102) and the external entity (104).

As stated above, a DMC provides some economic value in conjunction with a transaction. The transaction can include a sale, lease, rent, or a like exchange of a product, a service, and so on. The economic value can include any suitable modification of a term or condition of the transaction. For example, the economic value can be a reduction in purchase price of a product or products (e.g., a percent discount, a flat reduction in price, a discount or reduction of a second product or service based on purchase of a first product or service, and so on). As another example, the economic value can be an extension of a benefit (e.g., a warranty, customer service, technical support, etc.) associated with the transaction. It should be appreciated that the economic value can comprise any suitable economic consumer benefit utilized in conjunction with paper coupons or radio/television coupons, in addition to values and benefits specifically described herein.

In addition to the foregoing, a DMC is dynamic, and as such involves at least one characteristic that can vary based on determinable circumstances. For instance, the economic value of the DMC can vary. In another example, an expiration date of the DMC can vary. In still other examples, a product or service, a retailer, conditions of redemption (e.g., time, location), or like characteristics associated with the DMC, or a combination thereof, can vary. The variable characteristic can have a default state that is subsequently adjusted based on the determinable circumstances, or can have no predetermined default state. In the latter case, the state of the characteristic is undefined, or zero, until data pertaining to one or more determinable circumstances is obtained and analyzed.

Variable coupon characteristics of the DMC can be evaluated utilizing various factors. For instance, data pertinent to the mobile device 104, data pertinent to a sponsor/issuer of the DMC (102), data pertinent to a retail entity (e.g., retail store, online store, and so on) such as in-stock volume, data pertinent to a state of a user account, or interactions with other user accounts of other devices (e.g., sharing or recommending a DMC with another user), or independent factors such as time can be utilized as determinable circumstances. Such data can be collected in various manners. For instance, data pertinent to the mobile device 104 or a user account can be obtained from the mobile device 104 or by way of exchanging wireless signals (e.g., RF signals) with the mobile device 104. Data pertinent to a sponsor/issuer of the DMC or to a retail entity can be obtained dynamically by way of a communication link with one or more such entities, or the data can be manually entered, or can be predefined and stored by the coupon system 102. Once collected, data can be utilized to evaluate one or more variable coupon characteristics associated with the DMC.

Variable coupon characteristics of a DMC (e.g., redeemable value, multidimensional feature(s)) can be evaluated at any suitable time after receiving information pertinent to quantifying or qualifying such characteristic(s). For instance, a value of a DMC can be generated once an identity of a mobile device or user thereof is determined, once a location of the mobile device is determined, once a time of day is determined, or once a user/manufacturer/retailer/DMC profile is determined, or a combination thereof. According to some aspects, the characteristic can be determined prior to associating the DMC with the mobile device 104, after such association, or both (e.g., an initial parameter of the characteristic can be determined prior to association and the initial value can be altered based on later conditions). According to one or more further aspects, the characteristic can be generated in response to a user input (e.g., a user input can result in collection of data, application of data to a valuation formula, and/or display of a calculated value). In another aspect, the characteristic can be determined/updated before, concurrent with, or after transmission of the DMC or an indication of the DMC to the mobile device 104. In accordance with still one or more other aspects, the characteristic can be updated at a suitable point prior to or during redemption of the coupon. An updated characteristic can be based on the determinable circumstances, a predetermined time or sequence, and/or user input. Accordingly, a DMC is a very flexible and rich entity that can provide various consumer purchasing incentives and can be updated dynamically based on changing conditions, user input, and so on.

It should be appreciated that variable characteristics of the DMC can be fixed to prevent further variation of the characteristic. For instance, an initial parameter (e.g., quantitative amount) of a variable coupon characteristic (e.g., product discount, redeemable value) can be established upon generating the DMC for a particular device/user (104), associating the DMC with the device/user (104), transmitting the DMC or an indication thereof to the device/user (104), based on a user input at the mobile device 104, upon redemption, or upon sharing/trading the DMC with another device/user, or a suitable combination thereof. In some aspects, as discussed above, the variable characteristic can continue to vary based on changes in one or more determinable circumstances after the initial parameter is established. In other aspects, the variable characteristic can be fixed based on the initial parameter and not vary further. Alternatively, or in addition, the variable characteristic can be subject to further adjustment based on a set of circumstances provided by a coupon manufacturer, based on a user input at the mobile device 104, or a suitable combination of both. As one particular example, the initial parameter of the variable coupon characteristic can be established based on a determined circumstance(s) (e.g., location of the mobile device with respect to a retail outlet, and number of previous DMCs pertaining to the retail outlet that the device has received, redeemed, shared, viewed, etc.), when the DMC is associated with the device/user (104). Thereafter, the coupon characteristic can be fixed until redemption. At redemption, additional circumstances are determined and the coupon characteristic adjusted, as suitable. It should be appreciated that various other suitable examples of when the initial parameter can be determined and when it can be adjusted exist, as well as under what circumstances the determination/adjustment can occur. Accordingly, the subject disclosure is not limited to the specific examples recited herein.

In addition to the foregoing, coupon system 102 can include a filter module 106 that can select a particular mobile device 104 for distribution of a DMC. Selection can be based on criteria associated with the mobile device 104. For instance, a location of the mobile device 104 can be utilized in determining whether to generate a DMC for such device (104). In addition, time, an ID of the mobile device (e.g., subscriber identity module, mobile device calling number, or the like), an identity of a user of the mobile device, prior transaction history, prior coupon history, a user profile, sharing/trading mobile coupons with other user accounts, a DMC profile associated with a particular DMC, a manufacturer profile, a profile associated with a coupon distribution entity (102), a retailer profile, or a combination thereof or of like factors can be utilized to determine whether to generate the DMC for mobile device 104. Criteria for selecting a mobile device can be stored at coupon system 102. In addition, such criteria can be provided by a sponsor of the DMC (not depicted). Accordingly, a sponsor can provide a DMC only to those devices (104) that meet criteria identified by the sponsor.

Coupon system 102 can also include a valuation module 108 that establishes an initial parameter for the variable coupon characteristic of the DMC. According to one or more particular aspects of the disclosure, the initial parameter can be based on a determinable circumstance pertinent to mobile device 104. In other aspects, the initial parameter can be based on generic circumstances established by a sponsor of the DMC. The determinable circumstance can be a subset of the data utilized by the filter component 106 to select the mobile device 104, or can include additional data pertinent to the mobile device 104 (e.g., information in a user profile history, such as mobile shopping history, DMC usage history, DMC redistribution information such as inter-device sharing, and so on). Valuation module 108 can collect data pertinent to the determinable circumstance, apply the data to a predetermined formula, and establish the initial parameter of the DMC variable coupon characteristic. Data can be collected at the coupon system 102, from mobile device 104 or a network component (not depicted) associated with the coupon system 102 (e.g., a back-end server, data farm, or the like), from a sponsor of the DMC (e.g., a manufacturer), and so on.

Valuation module 108 can also continue to collect data associated with one or more determinable circumstances, and update the established initial parameter, accordingly. For instance, location of mobile device 104 can be monitored (e.g., by communication with the mobile device 104 or with an associated mobile network) and the established parameter updated periodically based on location. As another example, the value can be updated based on conditions provided by a manufacturer or retail entity associated with the DMC. As a more specific example, a restaurant can offer a first discount value if the DMC is redeemed during lunch operation (e.g., at a predetermined range of time) and a second discount value if the DMC is redeemed during dinner operation (e.g., at a second predetermined range of time). Valuation module 108, therefore, can update a concurrent value of the DMC based on time of day and lunch and dinner hours of the restaurant. It should be appreciated that any suitable circumstance utilized to establish a value for a DMC, as described herein, can also be utilized to update the value of the DMC at a subsequent point in time (e.g., upon redemption).

Coupon system 102 can also include a redemption module 110. Redemption module 110 can couple to a clearinghouse (not depicted) to facilitate application of a value of the DMC (e.g., established by the valuation module 108) to a transaction. For instance, if mobile device 104 redeems the DMC in conjunction with a transaction identified by the DMC (e.g., purchase of a hamburger at a fast food restaurant), a value established by the valuation module 108 can be applied to the transaction. Results of the transaction, including an identity of the DMC, the mobile device, a retail entity redeeming the DMC, a product/service involved, and/or value provided via the DMC, can be received by redemption module 110 (e.g., from the retail entity facilitating the transaction). Redemption module 110 can then perform a check to determine that terms and conditions of the DMC are accurately reflected in the transaction (e.g., the established value is appropriately provided to a transaction). If the transaction is appropriate, redemption module 110 can then transmit information pertaining to the DMC to the clearinghouse. The clearinghouse can perform various mediation functions, including performing an additional check for compliance with DMC terms and conditions, indemnifying the retail entity for applying the established value to the transaction, and so on. As described, system 100 provides for a flexible electronic coupon in a mobile environment, to facilitate directed marketing at consumers based at least in part on concurrent and determinable information associated with a mobile device 104.

Figure 2:
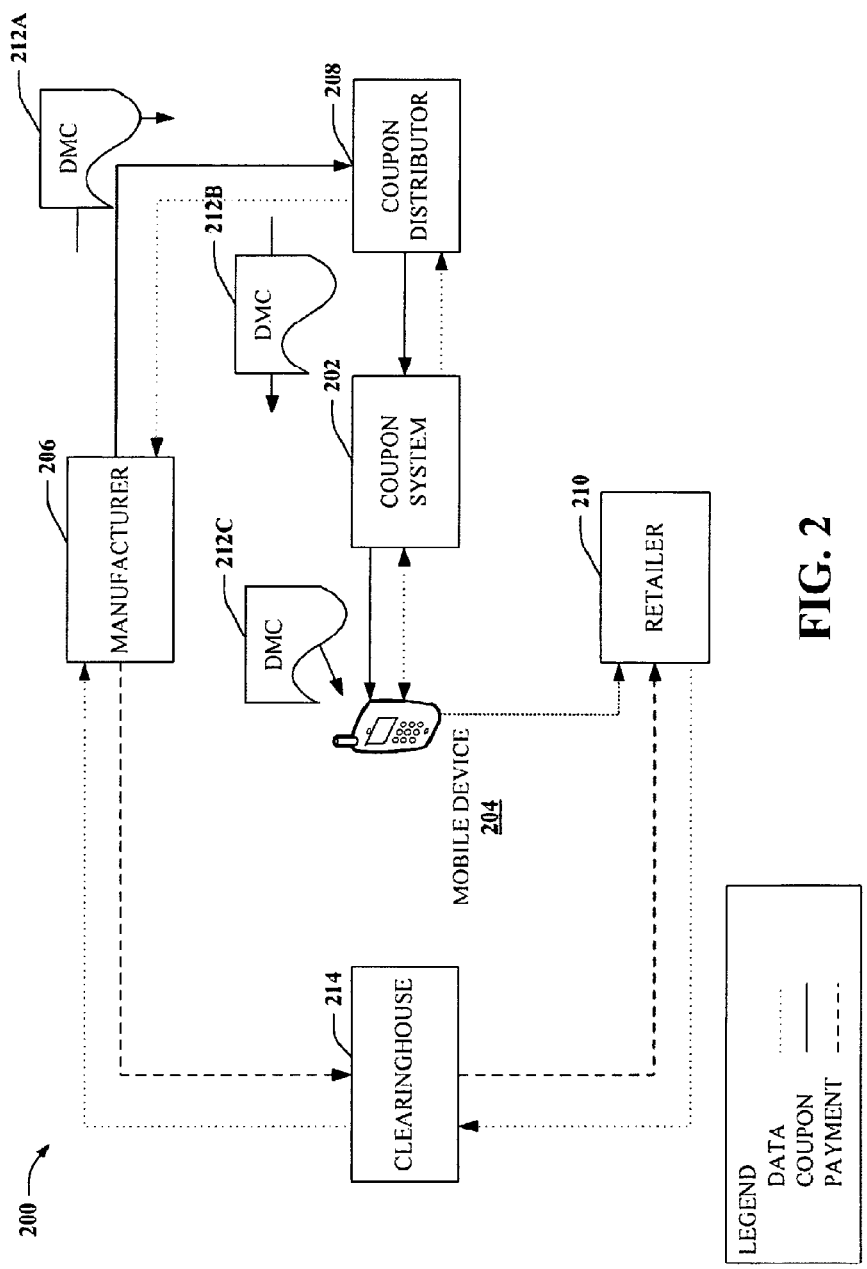
FIG. 2 illustrates a block diagram of an example system that facilitates distribution, redemption, and reimbursement of DMCs.

FIG. 2 illustrates an example system 200 that distributes and redeems a DMC according to aspects of the claimed subject matter. System 200 can include a coupon system 202 that can identify a desired mobile device 204 for distribution of a DMC (212A, 212B, 212C). Coupon system 202 can select mobile device 204 based on various criteria established by a manufacturer 206 that sponsors the DMC (212A, 212B, 212C). Examples of such selection criteria can include location or identity of mobile device 204, time of day, proximity of mobile device 204 to a retailer 210, or a combination of these or like factors.

Once mobile device 204 is selected, coupon distributor 208 generates a DMC (212A, 212B, 212C) provided by manufacturer 206 and associates the DMC with the mobile device 204. The coupon distributor 208 can then forward the DMC (212A, 212B, 212C) to coupon system 202. Coupon system 202 then distributes the DMC (212A, 212B, 212C), or a message identifying and/or describing the DMC (212A, 212B, 212C) to mobile device 204 (e.g., a short message service [SMS] message, e-mail message, text message, ad-hoc wireless data exchange, and so on). The DMC (212A, 212B, 212C) can have a variable coupon characteristic, such as redeemable value, evaluated by way of a determinable circumstance associated with the mobile device 204 and/or other components of system 200 (e.g., manufacturer 206, retailer 210). Coupon distributor 208 can comprise a mobile base station, a wireless node, a stand-alone wireless device that is manually uploaded with the DMC, or any other suitable wireless communication device.

Determination of the variable coupon characteristic can be done at a network component (e.g., coupon system 202, coupon distributor 208, etc.) or at the mobile device 204, or a combination of both. For instance, the DMC (212A, 212B, 212C) can contain instructions (e.g., an executable module) directing the mobile device 204 to establish a parameter for the variable coupon characteristic and rules for doing so. In other aspects, mobile device 204 can also provide information specified by the DMC (212A, 212B, 212C) to the coupon system 202 pertinent to determining this value (e.g., a GPS location of mobile device 204). In some aspects, if mobile device 204 is unable to obtain the variable coupon characteristic or initial parameter value from the coupon system 202 (e.g., due to inability to establish a wireless link), an executable module included within the DMC (212A, 212B, 212C) can be utilized to calculate the value at mobile device 204.

The determination, as discussed above, can be conducted at various suitable times. For instance, when mobile device 204 is first selected by coupon system 202, when the DMC (212A, 212B, 212C) is generated at coupon distributor 208, when the DMC (212A, 212B, 212C), or an indication thereof, is transmitted to the mobile handset 204, at a predetermined point in time after the mobile handset 204 receives the DMC (212A, 212B, 212C), as a result of a user input (e.g., recommending the DMC, forwarding the DMC to another mobile device via ad-hoc data exchange, or utilizing a network), based on activity of a third party (e.g., a 'buddy list' member obtains, recommends, redeems or somehow interacts with the DMC), based on a threshold change in a determinable circumstance associated with the mobile device 204, or upon redemption, or a combination thereof. Accordingly, in such aspects, an initial parameter can be adjusted (e.g., according to rules provided manufacturer 206) up until redemption of the DMC (212A, 212B, 212C).

As depicted, a DMC (212A, 212B, 212C) is transmitted to various components of system 200 as shown by the solid line arrows of FIG. 2. The DMC (212A, 212B, 212C) is first generated by a manufacturer or sponsor 206 of the DMC (212A, 212B, 212C). At this stage, DMC 212A can comprise a list of rules pertinent to distribution of the DMC (212A, 212B, 212C) to a mobile device 204. Rules can specify selection of a mobile device (204), identifying variable coupon characteristics of the DMC (212A, 212B, 212C), determining how to valuate those characteristics, and terms or conditions for redeeming the DMC (212A, 212B, 212C).

DMC 212A is received by coupon distributor 208. Coupon distributor 208 can generate an electronic file to package the DMC (212A, 212B, 212C). For instance, the electronic file can facilitate displaying and/or playing media pertinent to a product, value, redemption information, variable coupon characteristics, or rules for evaluating/updating such characteristics, and so on, of the DMC (212A, 212B, 212C). The electronic file can be in various formats based on feedback from the mobile device 204 (e.g., a pdf-type format, a word-processing format, a spreadsheet format, etc.).

Once an electronic package for the DMC (212A, 212B, 212C) is generated, and a mobile device 204 selected, DMC 212B is sent to coupon system 202. Coupon system 202, as discussed, can establish a value (e.g., an initial value, or a fixed value, etc.) of the dynamic aspects of the DMC 212C upon transmitting the DMC 212C to mobile device 204. Alternatively, coupon system 202 can leave the dynamic aspects undefined at such time. A version of the DMC (212A, 212B, 212C) received at mobile device 204 is indicated by DMC 212C.

The dotted line of FIG. 2 indicates data transmitted between components of system 200. Such data is sent to coupon system 202 and can include information pertinent to maintaining a wireless link with mobile device 204, location or identity information of the device (204), file compatibility or operating system information of the device (204) or like information. Data pertinent to generating and/or packaging a suitable DMC 212B is forwarded to coupon distributor 208 from coupon system 202. Optionally, data can be provided to manufacturer 206 indicating that a DMC has been distributed to the mobile device 204.

Mobile handset 204 can utilize the DMC 212C in conjunction with a transaction at a retailer 210 identified in the DMC 212C. Retailer 210 can be any suitable store, physical or virtual (e.g., an online Internet vendor), that can provide a product or service identified in the DMC 212C. Mobile handset 204 transmits the DMC 212C, or unique ID of the DMC 212C, or the like, to the retailer 210 in conjunction with a suitable transaction. Retailer 210 forwards the transaction information to a clearinghouse 214 for mediation, authorization, and/or reimbursement.

Clearinghouse 214 can be any suitable networked entity that can provide billing and mediation for a DMC (212A, 212B, 212C). Specifically, clearinghouse 214 obtains information pertinent to a transaction from retailer 210 that involves the DMC (212A, 212B, 212C). Clearinghouse 214 can determine whether the DMC (212A, 212B, 212C) is valid, whether applying the DMC (212A, 212B, 212C) to the transaction is valid, whether the DMC (212A, 212B, 212C) is properly applied to the transaction, and so on. If the information pertinent to the transaction matches specifications for the DMC (212A, 212B, 212C), clearinghouse 214 can forward data identifying the transaction and the DMC (212A, 212B, 212C) to manufacturer 206. Manufacturer 206 can then provide reimbursement for the DCM (212A, 212B, 212C) to clearinghouse 214, which forwards at least a portion of such reimbursement to retailer 210. Accordingly, system 200 provides one example system that can generate, distribute, redeem, and indemnify various entities in conjunction with implementing a DMC (212A, 212B, 212C) in a mobile environment.

Figure 3:
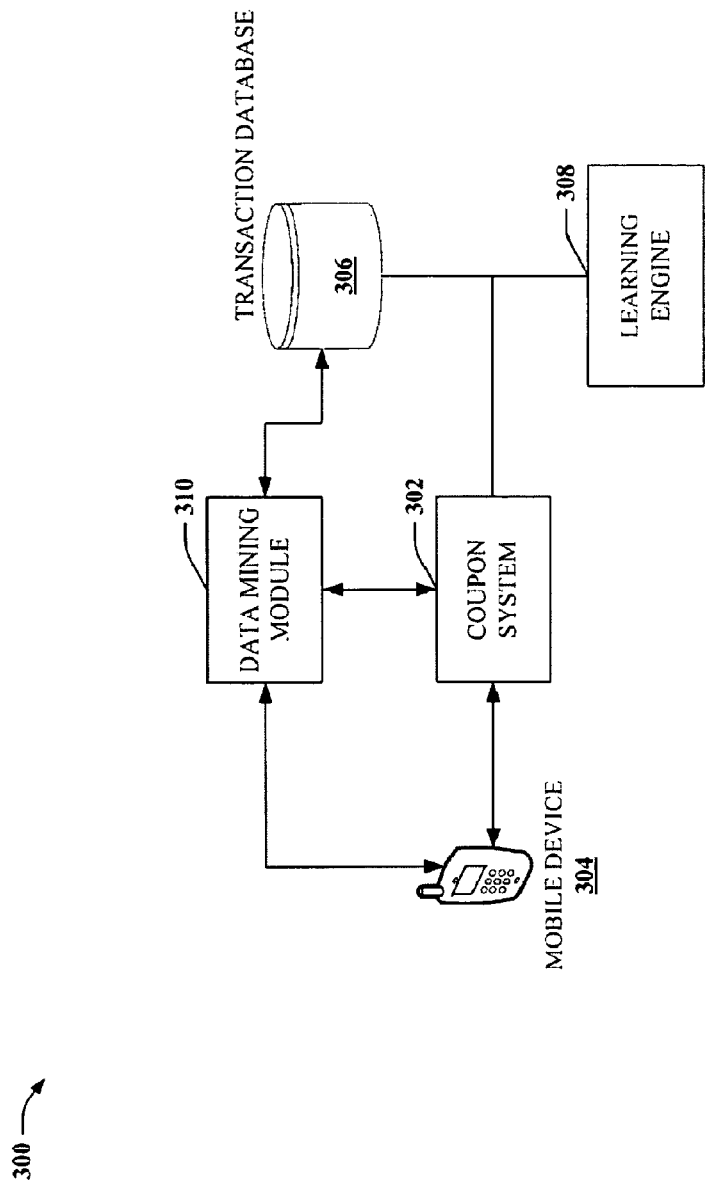
FIG. 3 depicts a block diagram of an example system that can dynamically valuate a DMC based on determined information according to one or more aspects.

FIG. 3 illustrates an example system 300 that can dynamically valuate a DMC based on determined information according to one or more aspects. System 300 can include a coupon system 302 that selects a mobile device 304 for a DMC, determines an initial parameter or value for a variable characteristic of the DMC, and facilitates redemption of the DMC, as described herein. It should be appreciated that coupon system 302 can be contained on a network (e.g., a server on the Internet, a component of a mobile network, etc.), contained within mobile device 304, distributed across the network and the mobile device 304, or separate from the network and the mobile device 304. Accordingly, selection, DMC generation, valuation, and redemption functions of coupon system 302 should not be limited to one such component of system 300.

According to some aspects, system 300 can include a transaction database 306 that stores information related to a user profile, a vendor profile, a DMC profile or a retailer profiler, or a combination thereof. A user profile can provide user preferences in conjunction with a DMC (e.g., indicating a desired sponsor, a desired retailer, a desired product, whether and/or what type of DMC is to be accepted at the mobile device 304, or the like). The user profile can also include prior transaction history associated with a user of the mobile device 304, including previous DMC received, cancelled, redeemed, stored on the device 304, and so on. The user profile can also indicate prior DMC transaction history, mobile shopping history, or sharing and social network history pertinent to DMCs. In some aspects, the user profile can include feature information of the mobile device 304 (e.g., for determining what multi-media features associated with the DMC can be activated). Information contained in the user profile can be utilized, at least in part, to select a mobile device (204) as a target device for DMC distribution and/or to determine a parameter of a DMC variable coupon characteristic (e.g. set a redeemable value), or other variable coupon characteristic of the DMC (e.g., re-distribution and sharing rules, multi-media features bundled within the mobile device).

According to some aspects, system 300 can include a data mining module 310 to interface with various system components (302, 304) to extract information and update transaction database 306. For instance, data mining module 310 can interface with mobile device 304 and obtain information pertinent to user transaction history, saved DMCs, preferred DMCs, DMCs viewed on a user interface of mobile device 304, DMC advertisements played at the mobile device 304, and so on. Such information can be forwarded to transaction database 306 and added to the user's (304) profile, a DMC profile, vendor profile, manufacturer profile, distributor profile, and/or retailer profile associated with the DMC. In similar fashion, data mining module 310 can interface with vendor, retailer, or distributor entities or with coupon system 302 (including sub-components of such system 302) and generate/update appropriate profiles at transaction database 306. Accordingly, information stored at transaction database 306 can be continually updated based on data extracted by data mining module 310.

According to some aspects, a vendor profile contained within the transaction database 306 can provide various rules for generating, distributing, evaluating and/or redeeming a DMC, as specified by a sponsor of the DMC (e.g., product manufacturer). Such information will be utilized by system 300 in conjunction with distributing a DMC, in conjunction with determining a value of the DMC, and/or other dynamic aspects of the DMC. A retailer profile can also be contained within the transaction database 306. The retailer profile can include information pertinent to a product or service identified in a DMC, availability of such product/service at a particular retail location, participation of such retail location in a DMC transaction, and additional terms or conditions imposed by the retailer. For instance, a retailer profile can indicate which locations will honor a DMC, current product/service availability applicable to the DMC, hours of operation, hours of redemption, any factors pertinent to determining a value of the DMC or other provided benefit (e.g., a change in redeemable value at various times of day), and the like. In addition to the foregoing, transaction database 306 can include a DMC profile that contains particular information pertinent to each DMC or type of DMC provided by a sponsor. The DMC profile can indicate special incentives included within the DMC (e.g., a product advertisement, see FIG. 4, infra), and how a variable coupon characteristic of the DMC is affected by such incentives. A DMC profile can be specific to a particular product or service, particular to a manufacturer, particular to a retailer, particular to a type of mobile device, or a combination thereof.

As a specific example of the foregoing, various profiles can be contained in transaction database 306 that affect a DMC. As a first example, a profile of User A could indicate that User A is interested only in DMCs related to pizza restaurants or pizza in particular. Thus, system 300 can ignore a mobile device 304 associated with User A when distributing a non pizza-related DMC. A profile of Manufacturer X can specify that a DMC is to have a variable redeemable value, depending on both proximity of the mobile device 304 to a retail location, and based on the time of day. In addition, Manufacturer X's profile can indicate that a DMC should be generated once each day and that all of Manufacturer X's DMCs are to expire within 30 days of distribution to a mobile device 304. Accordingly, system 300 can generate one DMC for Manufacturer X per day (e.g., calendar day), set and adjust a redeemable value of each Manufacturer X DMC based on location of a recipient mobile device (304) and time of day, and set an expiration date for such DMC(s) at 30 days from distribution to the recipient mobile device(s) (304). Likewise, similar information contained within a retailer or DMC profile can be integrated into terms, conditions, and variable coupon characteristics of a DMC.

System 300 can further include a learning engine 308 that employs machine learning to evaluate information contained in the transaction database 306 and make strategic determinations related to a DMC. In one aspect, learning engine 308 can employ user profile information to determine whether or what DMC is most appropriate to associate with a particular mobile device 304 (e.g., based on past DMC usage history, mobile shopping history, etc.). In another aspect, learning engine can employ such information to evaluate a determinable circumstance associated with a mobile device 304 and establish an initial parameter of a variable coupon characteristic (e.g., redeemable value, applicable media-features). Information utilized by learning engine 308 can be referenced with respect to at least one DMC distribution or valuation rule (e.g., provided by a DMC sponsor or distributor) for making the determinations (e.g., distribute a particular DMC only within 30 minutes of a time period that the DMC is most likely to be redeemed).

Information utilized by learning engine 308 can comprise any suitable information pertinent to the mobile device 304, a DMC, or a DMC sponsor, retailer, or the like (e.g., determined from an applicable profile). More specifically, such information can include time, mobile device location, distribution device location and/or retail store(s) location, user transaction or coupon history, frequent user coupon points, retailer profile information, DMC profile information, and so on. In one example, the learning engine 308 can utilize user mobile shopping history and DMC usage history to determine whether to distribute/associate the DMC with the mobile device 304, and determine an initial parameter for the variable coupon characteristic prior to such distribution/association. It should be appreciated that as data is updated at transaction database 306, the learning engine 308 can re-evaluate the information to update a state of the variable characteristic. As a particular example, if a DMC is presented for redemption, transaction module can access pertinent profile or history information to establish a final redeemable value for the DMC at time of redemption.

To make strategic determinations, learning engine 308 can utilize a set of models (e.g., user preference model, coupon sponsor model, usage/sharing history model, etc.) in connection with determining relationships between information contained in the transaction database 306 and rules for distributing and/or valuating a DMC. The models can be based on a plurality of information (e.g., a state of a user/manufacturer DMC distribution flag, frequency of past user DMC activity, user feedback pertinent to one or more DMCs, retail availability of a product/service, general mobile shopping history or preferences, location of the mobile device 304, distance between the mobile device 304 and DMC distribution device (302) and/or a retail entity, and so on). Optimization routines associated with learning engine 308 can harness a model that is trained from previously collected data, a model that is based on a prior model that is updated with new data, via model mixture or a data mixing methodology, or simply one that is trained with seed data, and thereafter tuned in real-time by training with actual field data provided by user interest vector 604.

In addition, learning engine 308 can employ learning and reasoning techniques in connection with making determinations or inferences regarding optimization decisions and the like. For example, learning engine 308 can employ a probabilistic-based or statistical-based approach in connection with modifying or updating data structures or data configurations pertinent to the mobile device 304, or drawing conclusions therefrom. The inferences can be based in part upon explicit training of classifier(s) (not shown) before employing the learning engine 308, or implicit training based at least upon manual input and the like. Data or policies used in optimizations can be collected from a specific database or from a community of databases (not depicted) of various types (e.g., obtained by data mining module 310), various applications and/or operating systems, for instance.

Learning engine 308 can also employ one of numerous methodologies for learning from data and then drawing inferences from the models so constructed (e.g., Hidden Markov Models (HMMs) and related prototypical dependency models, more general probabilistic graphical models, such as Bayesian networks, e.g., created by one or more structure searches using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various aspects described herein. As a non-limiting example, classifiers can be trained on a relationship between a user profile preference for a particular product or service identified in a DMC, and a retail entity's availability of such product or service (and, for instance, distance from a mobile device to the retail entity), or other examples described herein. As data is updated at transaction database 306, or additional data pertinent to mobile device 304, a DMC, a DMC supplier, or retail entity, etc., is identified, the classifiers can be retrained. For instance, when a DMC associated with a user profile/mobile device 304 is redeemed, data mining module 310 can update transaction database 308 with redemption information (e.g., ID of DMC redeemed, product/service, value applied to the transaction, etc.) and learning engine 308 can execute one or more classifiers to generate changes to inferences and results provided by the learning engine 308.

Methodologies employed by learning engine 308 can also include mechanisms for the capture of logical relationships such as theorem proverbs or more heuristic rule-based expert systems. Inferences derived from such learned or manually constructed models can be employed in optimization techniques, such as linear and non-linear programming, that seek to maximize some objective function. For example, manipulating data of user interest vector 604 to deconstruct such data and identify potential users associated therewith can be based on iterative interactions with the user input vector 604, common times at which particular subject matter activity occurs, common communications at which particular subject matter activity occurs, common data packets wherein particular subject matter activity occurs, and/or like factors suitable for data configuration optimization.

Accordingly, learning engine 308 serves as an interface to the profile information stored in the transaction database 306. Therefore, system 300 can continually determine and store information pertinent to a mobile device 304, a vendor or retailer of a DMC, and so on, to generate a current and accurate value for dynamic aspects of the DMC. Thus, according to some aspects, system 300 provides for expedient valuation of a DMC upon redemption.

Figure 4:
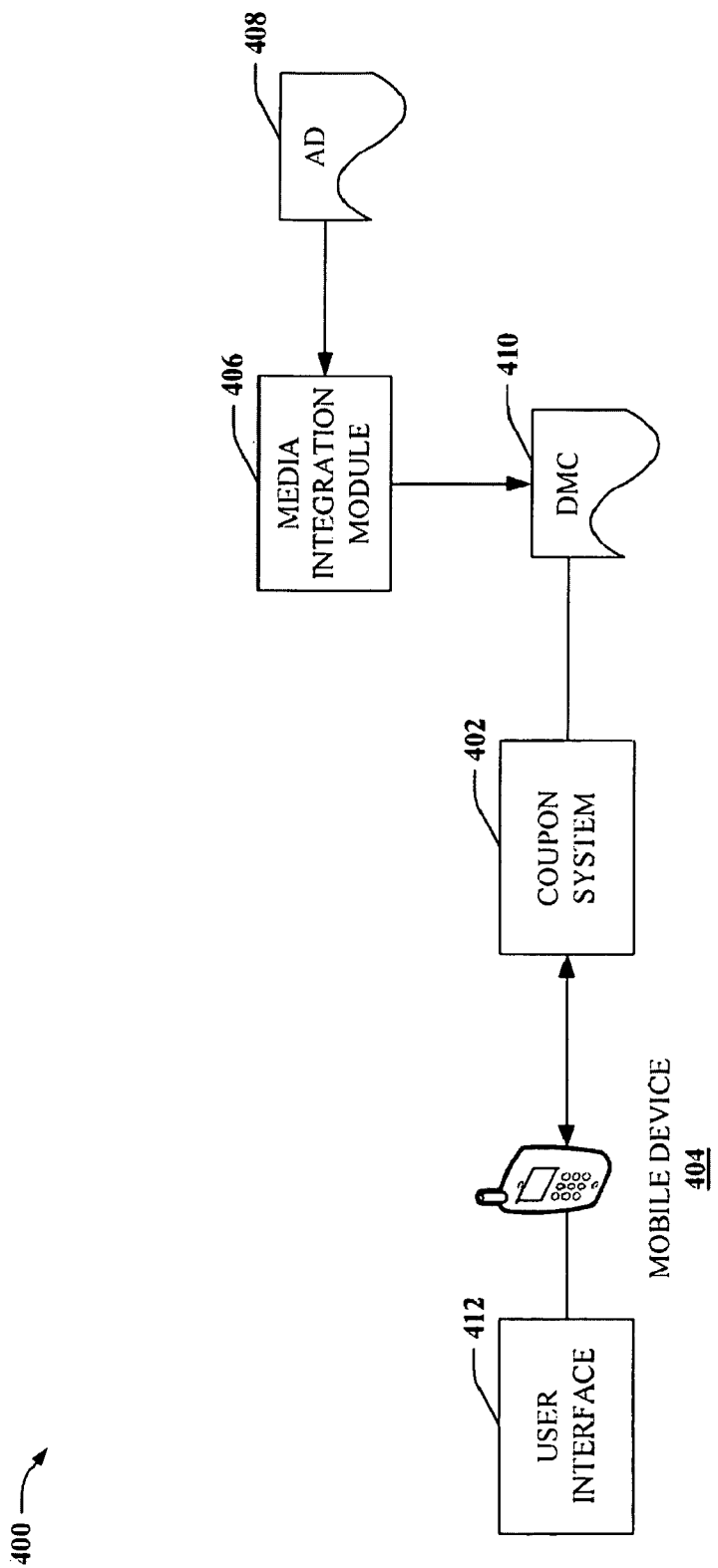
FIG. 4 illustrates a block diagram of a sample system that integrates dynamic media with a DMC and can valuate the DMC based in part on the media, according to one aspect.

FIG. 4 illustrates a block diagram of a sample system 400 that integrates dynamic media into or bundles dynamic media with a DMC 410 and can valuate the DMC 410 based in part on the media. System 400 includes a coupon system 402 that can generate, distribute, valuate, and/or facilitate redemption of a DMC 410 as described herein. Further, the coupon system 402 can select a mobile device 404 to be associated with the DMC 410 based on various criteria established by a sponsor (not depicted) of the DMC 410. In addition, system 400 can obtain and incorporate media (408) with the DMC 410. Such media (408) can include advertisements, product or manufacturer information, DMC distributor information, and so on. The media (408) can be packaged into a mobile device application that can be played at a user interface 412 of the mobile device 404. In some aspects, a state of a variable coupon characteristic (e.g., redeemable value) of the DMC 410 can be based in part, on whether the media (408) is played at the mobile device 404. Alternatively, or in addition, valuation of the variable coupon characteristic can be based at least in part on employing the device to indicate the media (408) is consumed (e.g., scanning a bar code of a print advertisement) or playing the media (408) on another device (e.g., Internet advertisement or streaming audio advertisement containing an electronic watermark viewed on a computer) associated with the mobile device or a user of such device (e.g., via a common username/logon ID). Thus, added incentive can be provided to a consumer in conjunction with viewing an advertisement, and in larger scales, DMC distribution can provide a beneficial platform for advertisers and product marketing.

System 400 can include a media integration module 406. Media integration module 406 can receive and store various media information (408), electronic files (408), and/or audio-visual programs, etc. Such media (408) can include advertisements, product/service descriptions, manufacturer, retailer or distributor information, or third party information, or a combination thereof or of like information. The information (408) can be pertinent to a DMC distributed to mobile device 404, tangentially related (e.g., pertaining to other products of a common manufacturer), or unrelated to the DMC 410 (e.g., provided by an unrelated sponsor).

In addition to the foregoing, media integration module 406 can integrate media 408 within a DMC 410 or bundle media with a DMC 410 that is associated with the mobile device 404. Further, the media integration module 406 can package the DMC (or, e.g., an indication of the DMC) and media into a mobile device application and transmit the application to mobile device 404. Accordingly, by accessing the DMC 410 at a user interface 412 of mobile device 404, information pertaining to the synchronized media (408) is presented or displayed. A user can then select the media 408 to view it on the mobile device 404. In some aspects, the media 408 can be automatically played on the mobile device 404 when the DMC is received, or selected, or the like.

According to at least one aspect, a particular mobile application can be utilized to package the media/DMC that provides various multidimensional functions to highlight feature richness of the DMC/media. For instance, the mobile device application can be configured to utilize an audio, visual, olfactory, gustatory (e.g., pertaining to the sense of taste) or tactile function of a target mobile device (404). Such function can be obtained from user profile information stored at the mobile device 404, a DMC application located on the mobile device, on a network transaction database (not depicted, but see FIG. 3, supra), and so on. Such functions can be employed, for instance, to augment a characteristic of a product or service associated with the DMC, or with an advertisement (e.g., third party ad, manufacturer ad, retailer ad, etc.) bundled into the media.

As one example of the foregoing, a mobile device 404 could comprise tactile sensory features (e.g., vibration device, tactile display) that provide tactual feedback. The tactile sensory features can be employed by a product-related application to convey tactual information to a user of the mobile device. For example, audio/video media 408 of a race car engine could be coupled with a tactile application that employs a vibration device or tactile display to give a user a representative 'feel' of the vibration caused by a powerful engine motor. A DMC associated with a high performance motor oil product could be bundled with the audio/visual/tactile media 408, which can serve as an advertisement of the product. It should be appreciated that the foregoing is simply one example of a sensory features (e.g., graphical display, audio controller and speakers, vibration device, tactile display, scent replicator) of a mobile device 404 that can be utilized to augment an aspect of a product or service associated with a DMC. Other examples of device sensory features (e.g., audio, visual, tactile, olfactory, gustatory, etc.) known in the art, or made known to one of skill in the art by way of the context provided herein, are included in the subject disclosure. Some examples can include employing olfactory features (e.g., pre-loaded perfume scents coupled with a scent spray or ejector) to augment media (408) pertaining to perfumes or other scented products (e.g., soaps, air fresheners). Another example can comprise media (408) employing combinations of sensory features, such as an audio/video presentation of a major league baseball World Series, coupled with device vibration coinciding with a roaring crowd and scents of buttered popcorn 'in the air'.

According to further aspects, media integration system 406 and/or coupon system 402 can affect a variable characteristic of the DMC 410 (e.g., redeemable value) based on the media 408. According to one particular example, if the media 408 is played by mobile device 404, a redeemable value of DMC 410 can be adjusted (e.g., increased). To this purpose, DMC 410 can record information pertinent to media 408. Specifically, DMC 410 can set a flag, or like indicator, once the media 408 is presented on the user interface 412 of the mobile device. The flag or indicator can then be submitted to coupon system 402, and the coupon system 402 can adjust a dynamic value of the DMC 410 accordingly. Thus, upon redeeming the DMC 410, additional value can be provided in conjunction with a transaction. Accordingly, a user of the mobile device 404 is presented incentive to view the media (e.g., advertisement) and a sponsor of the media is presented some indication that the media 408 was viewed.

In another aspect, the media can be an advertisement of a third party (e.g., that is not a sponsor, recipient, or distributor of the DMC). If the media is played at mobile device 404, DMC 410 can update coupon system 402 as described above. Coupon system 402 can then modify, initiate or complete a transaction with the third party based on playing the advertisement at the mobile device. Thus, system 400 can provide an additional revenue stream related to distributing and/or playing third party advertisements in conjunction with distribution of a DMC and/or advertisement media to target device.

According to still further aspects, coupon system 402 can request input in response to playing media at the user interface 412. For instance, questions pertinent to played media can be presented at the user interface 412 during or after playing the media. A user can answer the questions via the user interface 412 and transmit the answers to coupon system 402 through the mobile device 404. If answers are received, it is more likely that the user viewed the media 408 and, based on the feedback or answers, the user's opinion and/or understanding of the media 408 can be ascertained. In addition, a variable characteristic of the DMC 410 can be adjusted based on the questions/feedback in response to the media 408. As an example, a redeemable value, or an additional value or benefit can be provided based on the nature of the response to the media 408. As described, system 400 provides a mechanism to integrate advertisements and other media of third party entities with a DMC, to provide benefit for consumers as well as sponsors of the media.

Figure 5:
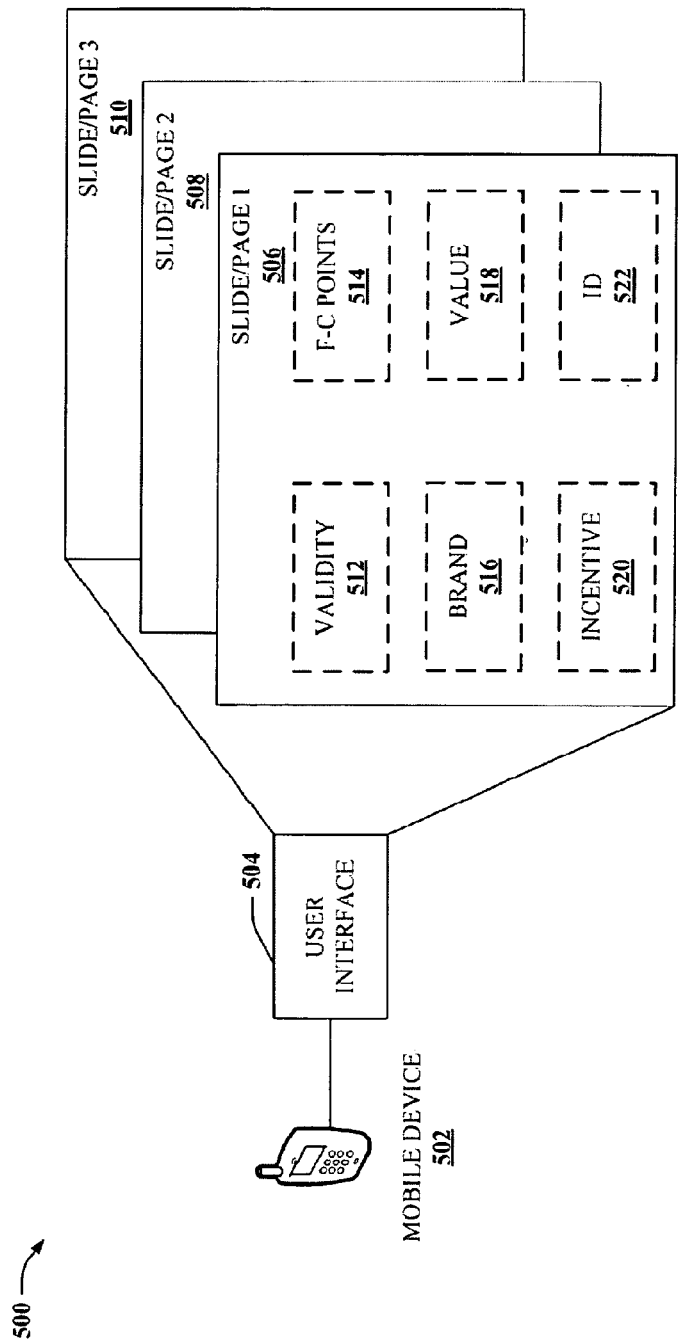
FIG. 5 depicts a block diagram of an example user interface that organizes and presents information pertinent to a DMC.

FIG. 5 depicts a block diagram 500 of an example user interface 504 that organizes and presents information pertinent to a DMC. User interface 504 is coupled to a mobile device 502. The mobile device 502 can receive one or more DMCs from a DMC distributor or like entity, as described herein. A representation of the DMC can include one or more features that can be defined by one or more feature representations of the DMC. The feature representations can be generated by one or more user interface devices or functions of the mobile device. For instance, one feature representation can include auditory information. Another feature representation can include graphical information. Further feature representations can include tactile or olfactory information. One or more such feature representations, separately or in combination, can comprise the representation of the DMC at the mobile device.

As described herein (e.g., see FIG. 4, supra), a DMC or indication thereof transmitted to a mobile device 502 can comprise a media file or electronic application that can present information, advertisements, etc. at a device user interface 504 in a feature rich multi-media format. In some aspects, the media file/electronic application can be incorporated into the DMC. In other aspects, the media file/electronic application can be included with the DMC. In addition, the media file/electronic application can employ audio, visual, olfactory, gustatory, or tactile functions or a combination of such functions, of the mobile device 504 to present the media and augment one or more aspects of the DMC or an advertisement associated therewith. Accordingly, feature richness and application multidimensionality of the DMC can be provided at the mobile device 502.

In one aspect, representation of a DMC can include multiple dimensions, such as multiple slides or layers (506, 508, 510). Each dimension or layer (506, 508, 510) can segregate information pertinent to the DMC. For instance, a first layer 506 can provide present information pertaining to a DMC. A second layer 508 can provide prior information pertaining to previous DMCs received at the mobile device 504, for instance, that are similar to the current DMC (e.g., common product, manufacturer, retailer, or the like). In addition, a third layer 510 can provide social networking information pertaining to a DMC.

As a particular example of social networking information, the third layer 510 can indicate a user preference (e.g., contained in a user profile, generated from prior transactions, etc.) associated with the DMC. In addition, the third layer 510 can tabulate preferences contained by associates of a user of mobile device 502. For instance, opinions or usage history of other individuals specified in a friends list can be shared between mobile devices (502) and stored on memory allocated to the DMC. Such information can also be obtained from social networking websites accessed by the mobile device 502. Information from identified trendsetters, statistical information pertaining to groups of individuals, and the like can be collected, stored, and displayed at the third layer 510. Thus, a user can access others' opinions and perceptions of the DMC, such as whether it provides a good value, how they liked an associated product/service, how they maximized value associated with the DMC, opinions of advertisements or other media coupled with the DMC (e.g., see FIG. 4, supra), and so on.

In some aspects, a layer (506, 508, 510) can include terms and conditions, redemption information, additional manufacturer/retailer/distributor product or business information, or the like. Such information can be organized in various suitable ways on the user interface 504 of a mobile device 502. It should be appreciated that various suitable business and social network information pertaining to entities associated with a DMC, as described herein or known to one of skill in the art, or pertaining to a device (502) or user can be contained on various DMC display layers (506, 508, 510).

According to some aspects, present information associated with a DMC can be displayed on at least one layer 506. The present information can include data describing the DMC, as well as associated entities, value, incentives, and redemption information pertaining to the DMC. For instance, a first portion 512 can provide validity information, including expiration date, status, and so on. A second portion 514 can display frequent-coupon user points associated with the DMC. For instance, if a user has redeemed one or more DMCs of a particular sponsor or vendor in the past, the points can provide an indication of how many DMCs have been redeemed, and provide additional value in conjunction with future redemptions.

In addition to the foregoing, present information can also include brand information displayed in another portion 516 of the first layer 506. Brand information can identify a product, provide information pertinent to the product or a supplier, and so on. Further, an additional portion 518 of the first layer 506 can provide a concurrent value of the DMC. The concurrent value can be a percent discount, flat discount, purchase-related discount (e.g., buy one get a second half price), added benefit (e.g., free customer service, technical support, etc.), or a combination thereof, as described herein or known to one of skill in the art. In addition, the concurrent value can be based on concurrent circumstances associated with the mobile device (e.g., location), independent criteria (e.g., time of day), relative criteria (e.g., number of related DMCs redeemed by other devices 502), retailer stock, and so on. Further, according to some aspects, the value (518) can be updated in response to a user input at the user interface 504. The value (518) can be modified, if appropriate, based on a state of circumstances pertinent to the value at a time of the input. Such circumstances and modification can be conducted at the mobile device 502, at a network server (not depicted), or a combination of both.

Additional information can also be displayed at a present information layer 506. For instance, one portion 520 can provide information pertinent to added incentives, such as media or advertisements included with the DMC. Moreover, another portion 522 can indicate an ID of the DMC. The ID can be displayed as a bar code, a string of digits, or the like. Display of the ID can also be utilized in conjunction with redemption of the DMC (e.g., a bar code displayed at the user interface 504 can be scanned by an electronic scanner at a point of service device, such as a cash register).

In one or more other aspects of the subject disclosure, multi-dimensional layers (506, 508, 510) can comprise different media applications pertinent to a DMC or advertisement. For instance, a first layer 506 can comprise a graphical depiction of a product associated with a DMC (e.g., a picture of a pizza with a manufacturer's logo or trademark). A second layer 508 can comprise an audio/visual application that plays an animated advertisement on the user interface 504. A third layer 510 can employ a particular function/feature of the mobile device (e.g., an olfactory feature comprising a scent loaded onto the mobile device 502) to augment an aspect of the product (e.g., the application can cause the mobile device 502 to release a pizza scent while the audio/visual application shows a hot freshly baked pizza). Thus, the multidimensionality of the user interface layers is not limited to segregating information, but can be employed to display various suitable multi-dimensional media features of the DMC at the user interface of the device. It should be appreciated that various information can be included within a user interface display of a mobile coupons, and FIG. 5 depicts an example only. Other mechanisms for organizing and displaying information pertinent to one or more DMCs, known to one of skill in the art, are contemplated and incorporated into the subject disclosure.

Figure 6:
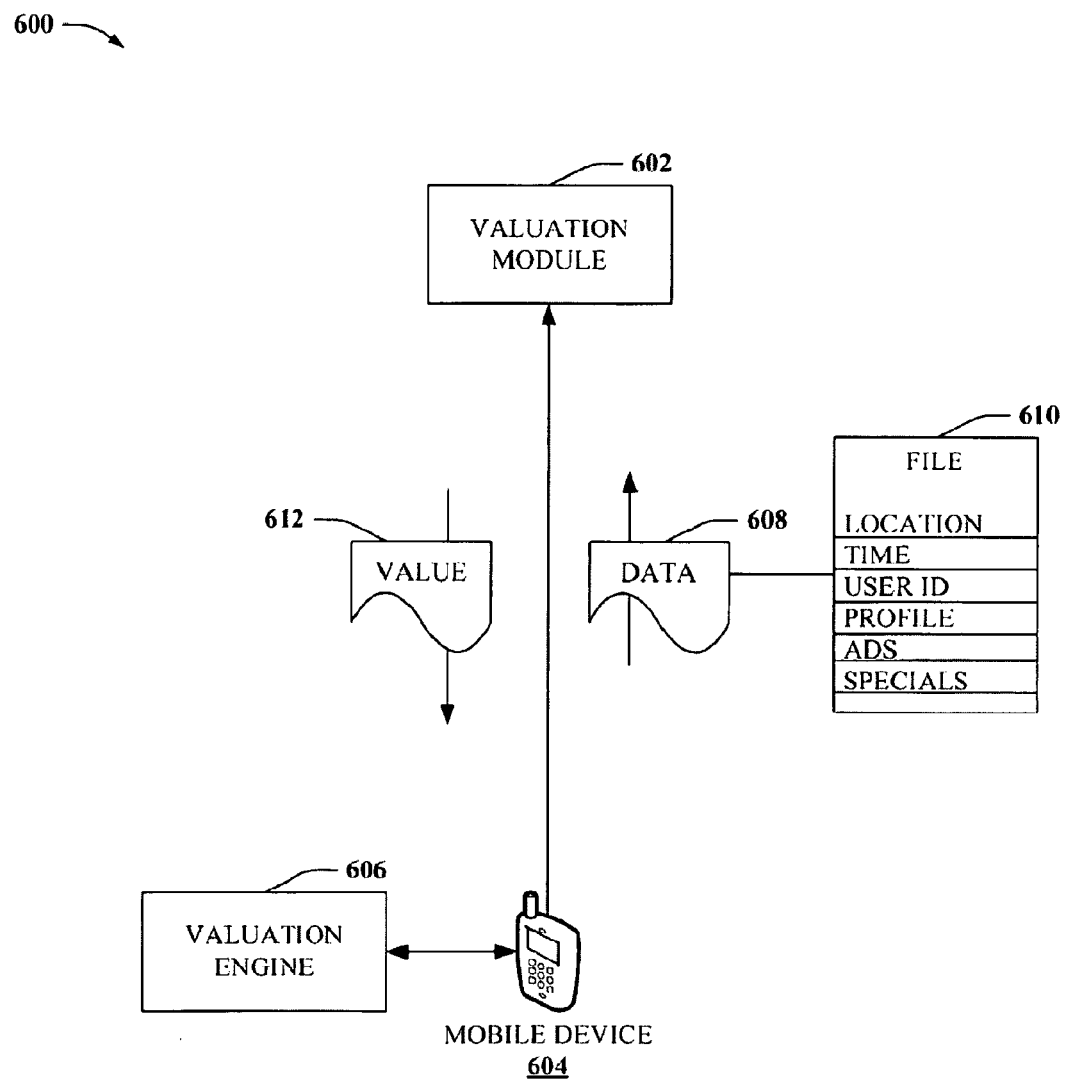
FIG. 6 illustrates a block diagram of an example system for determining a concurrent value of a variable value DMC according to aspects.

FIG. 6 illustrates a block diagram of an example system 600 for determining a current value of a variable-value DMC according to some aspects. System 600 can include a valuation module 602 that utilizes various data (608) to determine value for a DMC. It is to be appreciated that the data can be obtained at valuation module 602 at various points in time, including upon generation, transmission, and/or redemption of a DMC, as well as in response to a user input. It is further to be appreciated that valuation module 602 can reside proximate the mobile device 604, proximate a networked device (e.g., a mobile service provider, or an Internet server), or a combination thereof.

Mobile device 604 can include a valuation engine 606 that extracts a factor relevant to establishing a value for the DMC from mobile device 604. The factor can be related to any suitable information pertinent to such device 604. For instance, the factor can be related to location of the device 604 (e.g., determined by GPS, base station triangulation or like techniques, peer-to-peer ranging, and so on), identity the device 604 or a user of the device 604, a user profile contained at the device 604, prior DMC transaction history, DMCs stored at the mobile device 604, advertisements associated with DMCs, special manufacturer incentives, or a combination of these or like factors. Valuation engine 606 can access various software, applications, and modules of the mobile device 604 to collect data pertinent to the factor(s) to facilitate establishing a value of a DMC based on such factor(s).

Data collected by valuation engine 606 is included within a data file 610 and provided to the valuation module 602 as data 608. As described above, valuation module 602 can analyze information in the data file 610 and generate a value 612 for a DMC. A relationship between data 608 and value 612 can be based on one or more algorithms or rules provided by a sponsor of the DMC. Accordingly, terms, conditions and other limitations of the sponsor can be incorporated into the value (612) for the DMC. Valuation module 602 returns the value 612 to the mobile device 604, which can associate the value 612 with a DMC.

Exchange of data 608 for value 612 can be conducted at predetermined points in time (e.g., periodically, based on device location or change in location, etc.), or based on user request. For instance, a user can press a 'value update' button, or the like, associated with a graphical display of a DMC at the mobile device 604. Such an input can initiate data collection by valuation engine 606, as described above, and submission of the data 608 to valuation module 602. In some aspects, exchange of data 608 for value 612 can be conducted at issuance of the DMC, at redemption of the DMC, or other suitable circumstances.

Figure 7:
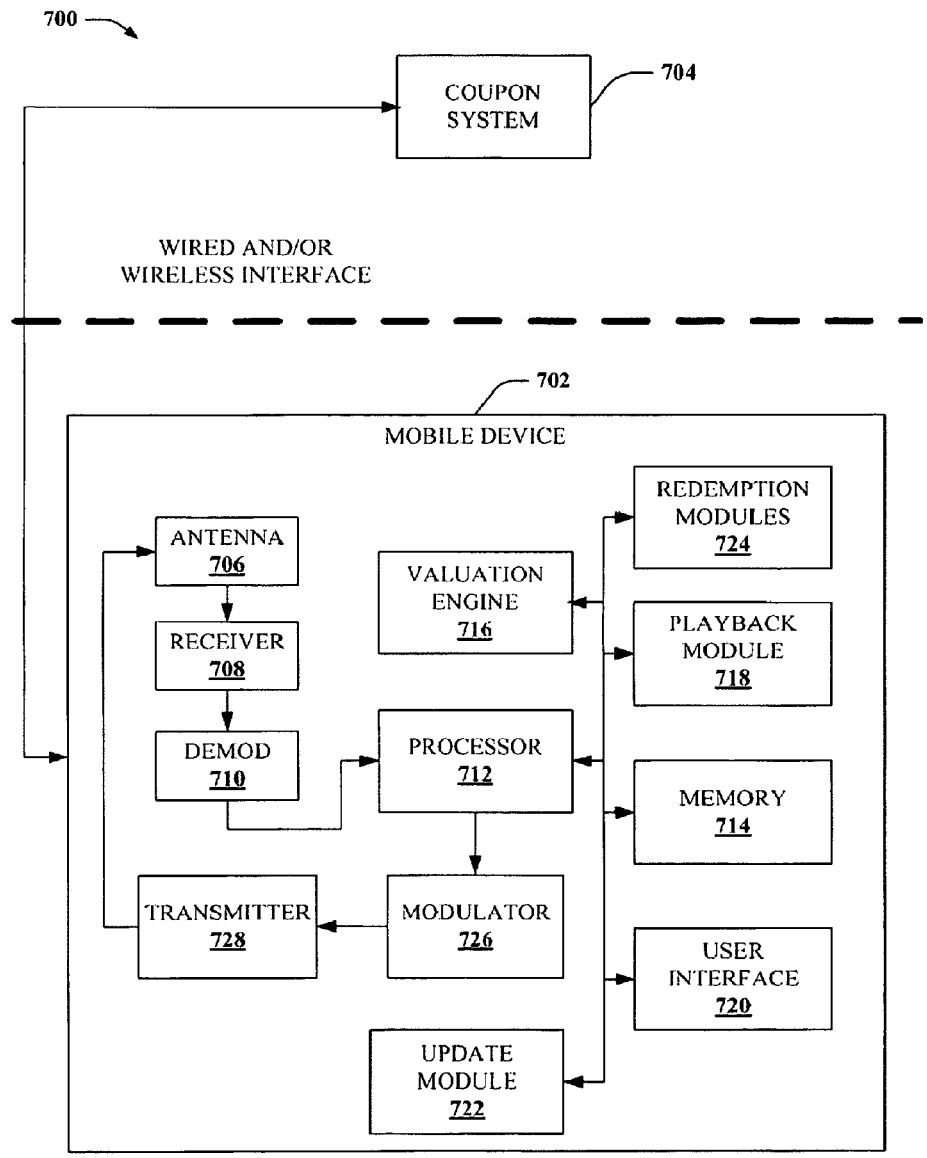
FIG. 7 depicts a block diagram of a sample mobile handset that can facilitate utilization and/or valuation of a DMC in accordance with further aspects.

FIG. 7 depicts a block diagram of a sample system 700 comprising a mobile handset 702 that can facilitate utilization and/or valuation of a DMC in accordance with further aspects. Specifically, mobile handset 702 can couple with a coupon system 704 that generates, issues and/or facilitates redemption of the DMC. In addition, the coupon system 704 can participate in valuation of the DMC, or in some aspects, the valuation can be performed at the mobile device 702 independent of the coupon system 704. Accordingly, value can be determined, in suitable circumstances, even where a link with the coupon system 704 is not available.

Mobile handset 702 includes at least one antenna 706 (e.g., a transmission receiver or group of such receivers comprising an input interface) that receives a signal (e.g., pertaining to voice call, data transfer, DMC value, and so on) and a receiver 708, which performs typical actions (e.g., filters, amplifies, down-converts, etc.) on the received signal. Specifically, antenna 706 can obtain a DMC from the coupon system 704 over a wireless link between such system 704 and the mobile device 702. Antenna 706 can also be involved in data exchange with coupon system 704 related to determining a value or other variable coupon characteristic of the DMC, determining a location or distance between the mobile handset 702 and coupon system 704, or the like. For instance, a valuation engine 716 can collect data pertinent to dynamic circumstances associated with the mobile device 702 (e.g., location, DMCs stored, prior transaction history, etc.). The information can be based on a query for information provided by coupon system 704, based on instructions stored at memory 714, or dynamically established at least in part by the coupon system 704 and mobile device 702, or a combination thereof.

Antenna 706 and receiver 708 can also be coupled with a demodulator 710 that can demodulate received symbols and provide them to a processor 712 for evaluation. Processor 712 can analyze information received by antenna 706 or a user input interface 720 of the mobile device 702, and/or generate information for transmission by a transmitter 726. Additionally, processor 712 can control and/or reference one or more components (706, 708, 710, 714, 716, 718, 720, 722, 724, 726, 728) of the mobile handset 702. Additionally, processor 712 can execute one or more modules, applications, engines, or the like (716, 718, 722, 724) that comprise information or controls pertinent to determining variable coupon characteristics of a DMC, factors for evaluating such characteristics, displaying such information at a user interface 720, or the like. Alternatively, or in addition, such modules (716, 718, 722, 724) can comprise information or controls pertaining to receiving and/or redeeming a DMC, as described herein.

Mobile handset 702 can additionally include memory 714 that is operatively coupled to processor 712. Memory 714 can store data to be transmitted, received, and the like. Such data can be pertinent to determining/verifying a variable coupon characteristic of a DMC. Alternatively, or in addition, the data can be pertinent to playing a media file associated with a DMC at a user interface 720 of mobile handset 702. In at least one aspect, memory 714 can store a DMC received at the mobile handset 702, as well as one or more factors, rules, etc., for determining and/or updating an initial parameter of a variable DMC characteristic.

Memory 714 can also be coupled with valuation engine 716 that can extract data from the mobile handset 702 in conjunction with determining a value of a DMC. According to some aspects, the valuation engine 716 can calculate a value (or, e.g., a state or parameter of another variable coupon characteristic) of the DMC based at least in part on the collected data. According to another aspect, the valuation engine 716 can send the collected data (e.g., via processor 712, modulator 726, and transmitter 728) to the coupon system 704 to calculate the value (or, e.g., other variable characteristic).

According to additional aspects, data collected by valuation engine 716 can include time, location of the mobile device 702, a user input provided at the mobile device 702, location of a vendor or retailer associated with a DMC, or a combination of these or like data. According to one or more other aspects, the valuation engine 716 can obtain an adjustment to a default or prior determined DMC characteristic or value based at least in part on additional data pertinent to such value. According to still other aspects, valuation engine 716 can freeze the value of the DMC based at least in part on the collected data, or a user input, or based on redemption of the DMC. According to still other aspects, valuation engine 716 can enable the value/characteristic to be re-evaluated by the mobile device 716 as data pertinent to determining such value/characteristic changes.

Memory 716 can also be coupled to a playback module 718 that can present information pertinent to the DMC at the mobile device 702. As an example, such information can include product description, supplier information, manufacturer information, retailer information, vendor information, redemption instructions, expiration information, DMC identification information, or value-added incentives (e.g., advertisements) associated with the DMC (e.g., see FIG. 5, supra). Playback module 718 can comprise suitable user interface modules to present the information pertinent to the DMC. For instance, the playback module 718 can include an audio/visual module that plays audio and/or video files configured for mobile device 702. Further, the playback module 718 can include a tactile module that utilizes a tactile function of mobile device 702 to provide tactile-related information pertinent to the DMC. According to some aspects, the playback module 718 can include an olfactory or gustatory module that utilizes suitable functions of mobile device 702 to provide smell or taste-related information pertinent to the DMC (e.g., scents stored on the mobile device 702 representative of a product associated with the DMC). Further, memory 716 can be coupled with a user interface 720 that can be coupled to playback module 718 for graphical, auditory, textual, and/or olfactory presentation of information, as suitable. The user interface 720 can also play a media file, advertisements, or the like, coupled to the DMC. Such media file can identify a product and concurrent redeemable value associated with the DMC, as well as applicable terms and/or limitations. The media file can further include advertisement data pertinent to the product, a sponsor of the DMC, related products, and so on, as described herein.

Memory 716 is also connected to an update module 722 that obtains a dynamic update to an algorithm that changes a manner in which the value for the DMC is generated. For instance, a DMC supplier can provide the dynamic update as an Internet download. Alternatively, the update can be pushed to the mobile device 702 by a mobile network (not depicted), or pulled from a mobile network (not depicted).

In addition to the foregoing, memory 716 can also be coupled with a redemption module 724. Redemption module 724 can collect information pertinent to the DMC, and concurrent characteristics of the DMC established by mobile device 702 and/or coupon system 704, and present such information to a point of sale device (e.g., an electronic cash register, etc.) in conjunction with a commercial transaction. The redemption module 724 can also verify that a value of the DMC is properly applied to the commercial transaction. In addition, redemption module 724 can forward results of the transaction to coupon system 704 (or, e.g., a clearinghouse) for mediation and billing (e.g., as a verification of similar results provided by the point of sale device). The redemption module 724 can facilitate submitting a DMC to a point of sale device, for instance, in conjunction with redeeming the DMC in a transaction. As non-limiting examples, the redemption module 724 can display an ID of the DMC on a device (e.g., to be read by a retail store operator, or provided by such operator by a user of mobile device 702), display a bar code or other indicia representing an ID of the DMC that can be scanned at a point of sale device, form a wired and/or wireless link to the point of sale device and submit the DMC ID to such device, couple directly with a back-end network entity (e.g., a network clearinghouse module) via a mobile network, or a combination thereof or of the like.

It should be appreciated that redemption of a dynamic mobile coupon in conjunction with a transaction can be implemented in other ways, in addition to those recited above. For instance, where a DMC is stored in memory 716, the DMC can be accessed from memory 716 based on a UI input associated with redemption of the DMC and output to a user and/or a POS device. Where the DMC is stored at a network server (e.g., short message server, text message server, Internet data server, Intranet data server, and so forth), the DMC, or indicia identifying the DMC can be obtained from such server based on the UI input, and output to the user and/or POS device. It should also be appreciated that the DMC and/or indicia identifying the DMC can be input into the POS device in various ways disclosed herein and/or known in the art (e.g., manually by reading the identifying information from a screen and providing such information to a clerk who enters it into the POS device, by optically scanning indicia identifying the DMC displayed on a UI of the device 702 into the POS device, through wired and/or wireless data exchange between the mobile device 702 and POS device, etc.). Furthermore, the indicia identifying the DMC can include a bar code or other graphical indicia, quantitative indicia (e.g., unique or semi-unique number), qualitative indicia (e.g., manufacturer description, product description, retailer description, and an identifier, or a combination thereof), etc. Furthermore, the DMC can be identified based on association with a user account (e.g., maintained on mobile device 702). Information identifying the user account (e.g., a phone number of the mobile device 702) can be entered into the POS device as described herein, and DMCs associated with the user account and pertinent to a transaction facilitated by the POS device (e.g., where a product/service associated with the DMC is involved in the transaction) can be accessed by such device (e.g., by manual input, direct communication with the mobile device 702, access to a network server). In addition to the foregoing, user loyalty cards (e.g., commercial loyalty cards provided by an entity associated with the POS device, such as a retail store, online store, or the like) associated with the user account can be accessed and applied to the transaction, as provided by rules associated with such user loyalty cards. In at least one aspect of the subject disclosure, the user account can be accessed by providing user loyalty card information or payment card information coupled with the mobile device 702 or a user account associated with the mobile device (e.g., through near field communication [NFC] or Felica phones where payment ID is stored on mobile device 702 and transferred to the POS device, through a one-time payment code accessed by the mobile device 702 from a network server, such as short message server or the like, and provided to the POS device, where the network server receives subsequent DMC redemption requests coupled with the payment code and can identify the user account, DMC(s), and/or payment/loyalty cards associated with such payment code to facilitate verifying and/or implementing a transaction). In at least one aspect of the subject disclosure, a personal computer or other computing device (e.g., laptop, PDA, etc.) can be substituted for mobile device 702 and utilize wired and/or wireless communication with remote devices to implement aspects of the disclosure provided herein.

Mobile handset 702 still further comprises a modulator 724, and a transmitter 726 that transmits generated signals (e.g., by processor 712 and modulator 724) to, for instance, coupon system 704, a base station, an access point, another access terminal, a remote agent, a point of sale device, etc. Although depicted as being separate from the processor 712, it is to be appreciated that valuation engine 716 can be part of processor 712 or a number of processors (not shown).

The aforementioned systems have been described with respect to interaction between several components, modules, and/or electronic interface functions. It should be appreciated that such systems and components/modules/functions can include those components or sub-components specified therein, some of the specified components or sub-components, and/or additional components. For example, a system could include coupon system 102, mobile device 104, transaction database 306, transaction module 308, and valuation module 602, or a different combination of these and other components. Sub-components could also be implemented as components communicatively coupled to other components rather than included within parent components. Additionally, it should be noted that one or more components could be combined into a single component providing aggregate functionality. For instance, data mining module 310 can include transaction database 306, or vice versa, to facilitate collecting and storing data pertinent to various user or supplier profiles or histories by way of a single component. The components may also interact with one or more other components not specifically described herein but known by those of skill in the art.

Furthermore, various portions of the disclosed systems can include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems more adaptive as well as efficient and intelligent.

It is to be understood that the aspects described herein can be implemented in hardware, software, firmware, middleware, microcode, or any combination thereof. For a hardware implementation, the processing units can be implemented within one or more ASICs, DSPs, digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the aspects are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Referring to FIGS. 8-11, methodologies relating to providing a DMC in a mobile environment are provided, according to one or more aspects. While, for purposes of simplicity of explanation, the methodologies are shown and described as a series of acts, it is to be understood and appreciated that the methodologies are not limited by the order of acts. For example, in accordance with one or more aspects, some acts can occur in different orders and/or concurrently with other acts from that shown and described herein. In addition, those skilled in the art will understand and appreciate that a methodology could alternatively be represented as a series of interrelated states or events, such as in a state diagram. Moreover, not all illustrated acts are necessarily required to implement a methodology in accordance with one or more aspects.

Figure 8:
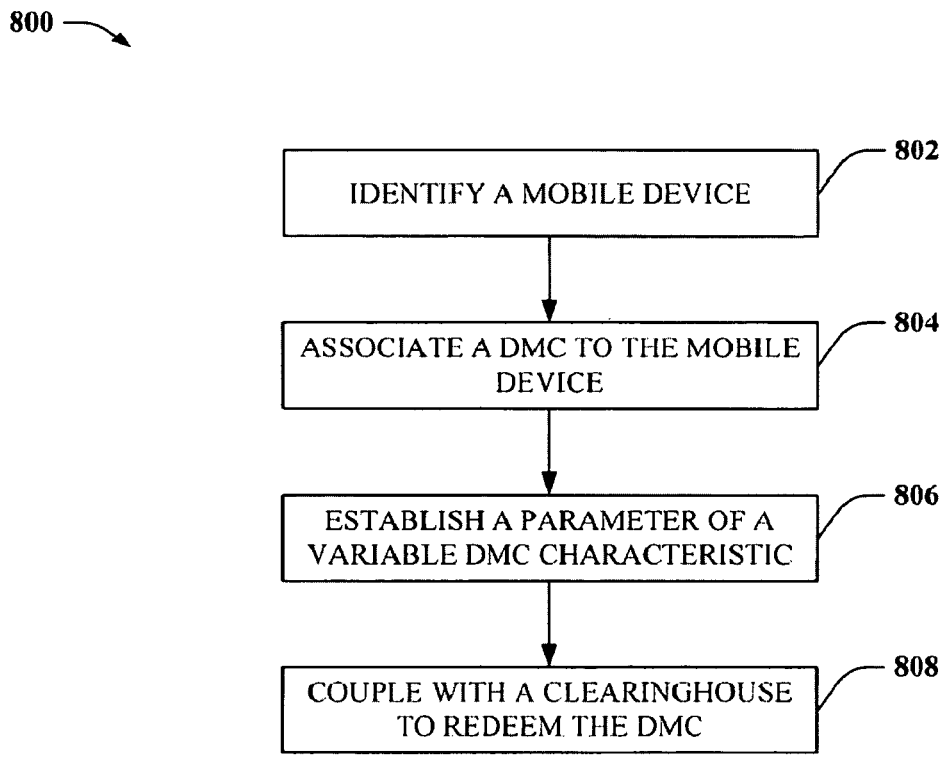
FIG. 8 illustrates a flowchart of a sample methodology for providing variable value DMCs in a mobile environment.

FIG. 8 illustrates a flowchart of a sample methodology 800 for providing variable value DMCs in a mobile environment. At 802, method 800 can identify a mobile device according to predetermined criteria. Identification can involve, at least in part, transmitting at least one signal to the mobile device or receiving at least one signal from the mobile device. Further, the mobile device can be identified based on the predetermined criteria, which can be provided by a sponsor of a DMC. For instance, such criteria can include a location of the mobile device, a time of day, an ID of the mobile device, prior interaction with the mobile device, user, DMC sponsor, retailer, and/or distributor profile information, including DMC usage history, mobile shopping history and the like, or a combination of these or like circumstances. Accordingly, identification of the mobile device relates to one or more qualifications provided by a DMC sponsor, determined at least in part based on wireless communication with the mobile device.

At 804, method 800 can associate a DMC with the mobile device, where the DMC has at least one variable coupon characteristic. The variable coupon characteristic can vary as a function of one or more determinable circumstances pertinent to the mobile device. Such circumstances can include location of the mobile device, distance to a predetermined entity (e.g., a retail store), time, user profile information, vendor profile information, DMC profile information, retailer profile information, previous DMCs distributed to/utilized by the mobile device, DMCs stored at the mobile device, prior redemption of DMCs associated with the mobile device, and so on. Information pertaining to the determinable circumstances can be obtained from the mobile device, an entity communicatively coupled with the mobile device (e.g., a base station, wireless transmitter), or a server of a network entity (e.g., a mobile network server maintained by a service provider associated with the mobile device). The variable characteristic can include a redeemable value, applicable transactions or products/services associated with such transactions, time of redemption, location of redemption (e.g., a predetermined store or online website), additional media provided with the DMC, various feature richness associated with the DMC or media, or a combination of these or like characteristics.

At 806, method 800 can establish an initial parameter of the variable coupon characteristic based at least in part on at least one determinable circumstance pertinent to the mobile device. Such circumstances and their applicability to the variable coupon characteristic and/or initial parameter can be established by rules of a sponsor of the DMC. According to some aspects, establishing the initial parameter can render the value constant, independent of additional determinable characteristics described above or changes in such characteristics. According to other aspects, establishing the initial parameter can render the value constant until a predetermined circumstance occurs, in which case the value can change again (e.g., a cancellation can occur rendering the value zero). Such predetermined circumstance can comprise associating the DMC with a target mobile device, receiving a value acceptance input from the target mobile device, identifying a threshold change in a determinable circumstance utilized to establish the initial parameter (or, e.g., a related determinable circumstance described above), and/or receiving notice that the DMC is presented for redemption, or a combination of these or like factors.

At 808, method 800 can communicatively couple with a clearinghouse server to redeem the DMC in conjunction with a transaction. Further, the clearinghouse can facilitate modifying a default characteristic of the transaction based on a state of the variable coupon characteristic (e.g., a current redeemable value). In general, the clearinghouse can provide billing, mediation, authorization, and/or security functions for the transaction. For instance, the clearinghouse can analyze information pertinent to the transaction and DMC and determine whether the DMC and transaction are appropriate. Further, the clearinghouse can update a manufacturer as to redemption status of the DMC. According to other aspects, the clearinghouse can cancel the DMC upon redemption (or, e.g., upon expiration of an active data) to mitigate unauthorized additional redemption.

According to further aspects, the clearinghouse can act as an intermediary between a sponsor of the DMC and a retail entity that redeems the DMC. Specifically, the clearinghouse can relay transaction information to the sponsor and can provide indemnification/reimbursement to the retail entity or other sponsor of the transaction a modified default characteristic of the transaction (e.g., resulting from application of the DMC to the transaction). Accordingly, methodology 800 provides for targeting a DMC based on individual characteristics of a mobile device, and providing flexible characteristics, such as redeemable value, based on predetermined sponsor criteria.

Figure 9:
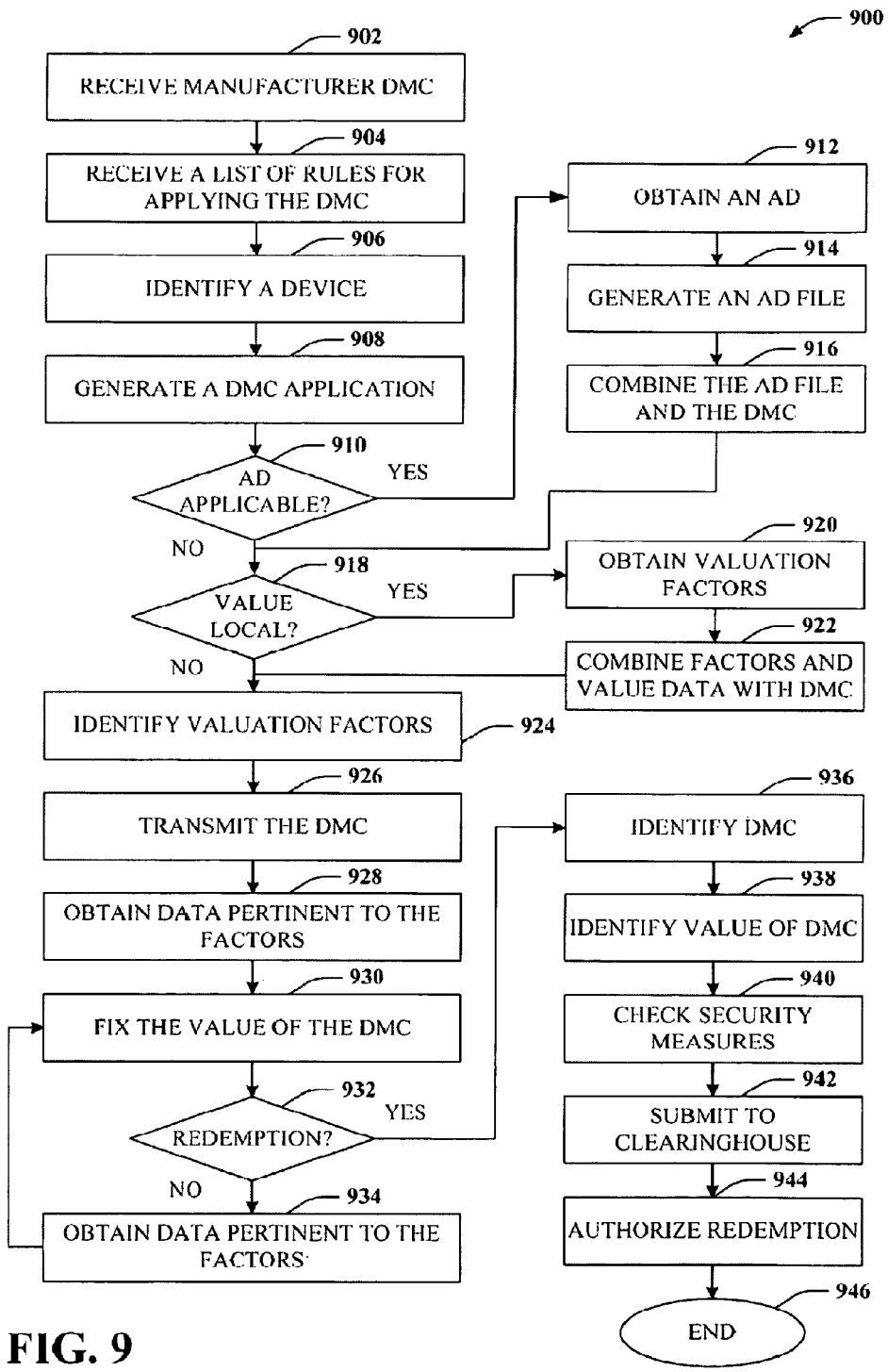
FIG. 9 depicts a flowchart of an example methodology for distributing, evaluating, and redeeming variable value DMCs in accordance with one aspect.

FIG. 9 depicts a flowchart of an example methodology 900 for distributing, evaluating, and redeeming variable value DMCs in accordance with some aspects. At 902, method 900 can receive a DMC from a manufacturer or other sponsor of the DMC. At 904, method 900 can receive a list of rules pertinent to applying the DMC to a mobile device. Specifically, the rules can provide for identifying a suitable device as a target device for DMC distribution, establishing circumstances for valuating one or more variable coupon characteristics of the DMC (e.g., evaluating determinable circumstances of a mobile device to establish an initial parameter of the variable characteristic), and redemption of the DMC.

At 906, method 900 can identify a suitable device in accordance with the list of rules received at reference number 904. At 908, method 900 can generate a DMC application, playable at the identified device, according to the list of rules. At 910, method 900 determines whether an advertisement is to be coupled with the DMC. Such determination can be based on the identified device, on the rules provided by the manufacturer/sponsor, or like circumstances. If an advertisement is to be coupled with the DMC, method 900 proceeds to reference number 912, if not, method 900 can proceed to reference number 918.

At 912, method 900 can obtain an advertisement to be coupled with the DMC. The advertisement can include various information pertaining to the DMC, including sponsor information, redemption information, product or service information and/or related products or services (e.g., offered by the sponsor or a retail entity). According to some aspects, a third party can provide the advertisement instead of or in addition to the sponsor, retailer, etc. At 914, method 900 can generate an advertisement media file that can be played on a user interface of the device identified at reference number 906. At 916, the media file is combined or bundled with the DMC (or, e.g., an indication of the DMC), packaged into a suitable mobile device application playable at the identified mobile device, and transmitted to the identified device.

In some aspects, the mobile device application can be selected to utilize an audio, visual, olfactory, or tactile function of the target mobile device. Further, the application can be configured to employ such function of the identified mobile device to augment a product, service or other aspect of the DMC or advertisement. It should be appreciated that where the advertisement is of a third party (e.g., that is not a sponsor, recipient or distributor of the DMC), an indication that the third party advertisement is played at the mobile device can form the basis for modifying, initiating or completing a transaction with the third party. Accordingly, bundling advertisements of third parties can provide an additional revenue stream in conjunction with distributing a DMC.

At 918, method 900 can determine whether a redeemable value (or, e.g., other suitable variable coupon characteristic of the DMC) is determined at the identified mobile device or at a server device. If the redeemable value is determined at the server device, method 900 can proceed to 924. If, on the other hand, the redeemable value is determined at the mobile device, method 900 can proceed to 920.

At 920, valuation factors pertinent to determining the redeemable value (or other suitable variable coupon characteristic of the DMC) are obtained. Such factors can include, for instance, location of the mobile device, time of day, user, sponsor or retailer profile information, whether media, advertisements or other special incentives were viewed at a mobile device, as described herein, or a combination of these or like factors. At 922, method 900 can combine the factors and valuation data with the DMC for distribution to the identified mobile device.

At 924, method 900 can identify valuation factors pertinent to determining the variable coupon characteristic of the DMC (e.g., if not done at reference number 920). At 926, the DMC can be transmitted to the identified mobile device. Confirmation of receipt of the DMC can also be obtained and stored for reference. At 928, data pertinent to the factors determining the variable coupon characteristic can be obtained. Such data can be obtained from the mobile device, determined from data exchange with such device, or data exchange with an external entity (e.g., base station of a mobile network). At 930, the value of the DMC, or other variable coupon characteristic, can be fixed based on the data obtained at reference number 928. Fixing the value can be permanent, or can be dependent upon occurrence of some predetermined circumstance (e.g., obtaining additional data pertinent to the mobile device, redeeming the DMC, etc.).

At 932, a determination is made as to whether the DMC has been submitted for redemption. If no redemption has been determined, method 900 can proceed to 934 where additional data pertinent to the factor(s) establishing the dynamic value can be obtained and/or monitored. Method 900 can then proceed back to 930 to determine whether the value or variable coupon characteristic should again be fixed based on any additional data obtained at reference number 934. If, at reference number 932, the DMC has been submitted for redemption, method 900 can proceed to 936 where the DMC is identified and cross-referenced with rules for redemption obtained at reference number 904.

At 938, method 900 can identify a value (or, e.g., other suitable variable coupon characteristic) of the DMC. The value can be previously determined (e.g., at reference number 930) or updated based on information obtained in conjunction with redemption. At 940, method 900 can check security measures associated with the DMC. Such measures can include checking proper encryption or security information associated with the DMC, determining whether the DMC has been previously redeemed, determining whether a redeeming entity is authorized to redeem the DMC, and so on. Based on such information, method 900 can apply or authorize application of the DMC to a transaction, and modify a default characteristic of the transaction based on the value (or, e.g., other suitable variable coupon characteristic).

At 942, method 900 can submit details of the redemption and an associated transaction to a clearinghouse for mediation and billing. AT 944, method 900 can receive information from the clearinghouse. If the information approves the transaction, redemption of the DMC can be authorized. According to further aspects, indemnification/reimbursement of a sponsor of the transaction provided by the clearinghouse can be forwarded to such sponsor (e.g., an entity honoring the DMC). At reference number 946, method 900 can end.

As described, method 900 provides a flexible mechanism to distribute a DMC in a mobile environment based on criteria established by a sponsor of the DMC. In such a manner, the DMC can be targeted toward a particular mobile device, rather than limited to a general mass mailing. Further, the DMC can be associated with rich and dynamic media and advertisements presented at a graphical display of the mobile device. In addition, characteristics of the DMC can be dynamically adjusted, including a redemption value, to facilitate increasing or decreasing consumer-purchasing incentive. Accordingly, many benefits are provided by distribution of DMCs in a mobile environment as described by the aspects presented herein.

Figure 10:
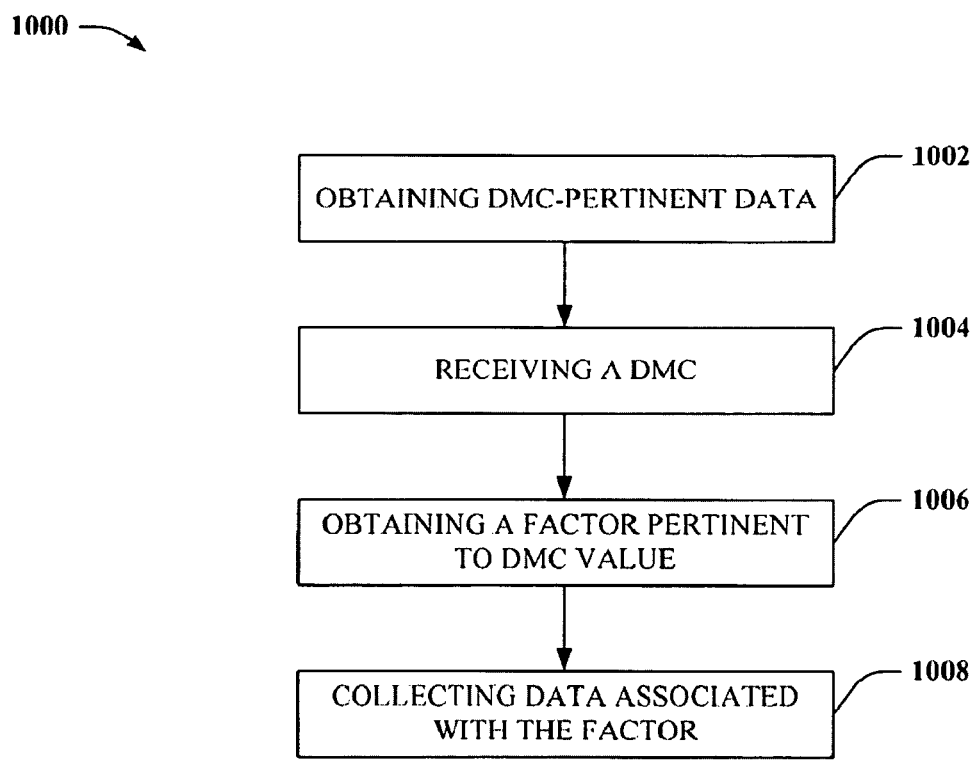
FIG. 10 illustrates a flowchart of an example methodology for facilitating use of a DMC in a mobile environment.

FIG. 10 illustrates a flowchart of an example methodology 1000 for facilitating use of a DMC in a mobile environment. At 1002, method 1000 can obtain data pertinent to distribution of a DMC to a mobile device. The data can include suitable transaction specifications or recommendations associated with distribution of the DMC, if any. In addition, the data can include one or more queries for information, wherein distribution of the DMC is conditioned at least in part on responding to the query or queries. The queries can include a unique identity of the mobile device, an identity of a user of the device, a location of the device, user profile information stored at the device, and so on, as described herein.

At 1004, method 1000 can receive the DMC or an indication of the DMC, where the DMC has at least one variable coupon characteristic. Receiving the DMC can be based in part on, for instance, proper response to a query at reference number 1002. The DMC can include a stand-alone file or application that can operate on a mobile device. The stand-alone file can be displayed on a user interface of the device to provide information to a user and present feature richness and/or multi-dimensional aspects of the DMC. In addition, the stand-alone file can obtain and or utilize information to determine a value of the DMC. According to further aspects, the stand-alone file can facilitate redemption of the DMC at a retail entity. For instance, the file can obtain an identity of the DMC, and pertinent security, applicability, redemption value, and like information associated with redeeming the DMC. Accordingly, dynamic functions of the DMC can be performed, at least in part, at the mobile device receiving the DMC.

At 1006, a factor can be obtained that is pertinent to establishing an initial parameter for the variable coupon characteristic. The factor can include any suitable information pertaining to the mobile device, a product, service, manufacturer/sponsor, distributor or retailer associated with the DMC, or the like, as described herein. At 1008, data associated with the factor can be collected to facilitate establishing the initial parameter of the variable coupon characteristic (e.g., redemption value of the DMC). In one aspect, the data can be analyzed and the parameter determined at the mobile device. In other aspects, the data can be forwarded to a network device (e.g., Internet server, component of a mobile operator's network) for determination of the initial parameter. The initial parameter can be fixed to mitigate change to the variable coupon characteristic based on input at the mobile device, or can be un-fixed, and thus re-evaluated to update the initial parameter. Such re-evaluation can be based on association of the DMC with the mobile device, a threshold change in the circumstance(s) utilized to determine the initial parameter or related circumstances, redemption of the DMC or an input at the mobile device (e.g., an acceptance of the value), or a combination thereof or of the like. As described, method 1000 provides for receiving and interacting with a DMC to determine variable coupon characteristics of the DMC. The variable coupon characteristics can be based on information at a receiving device, and thus can be at least partially independent of an issuing or redeeming device, providing autonomy and flexibility for the DMC.

Figure 11:
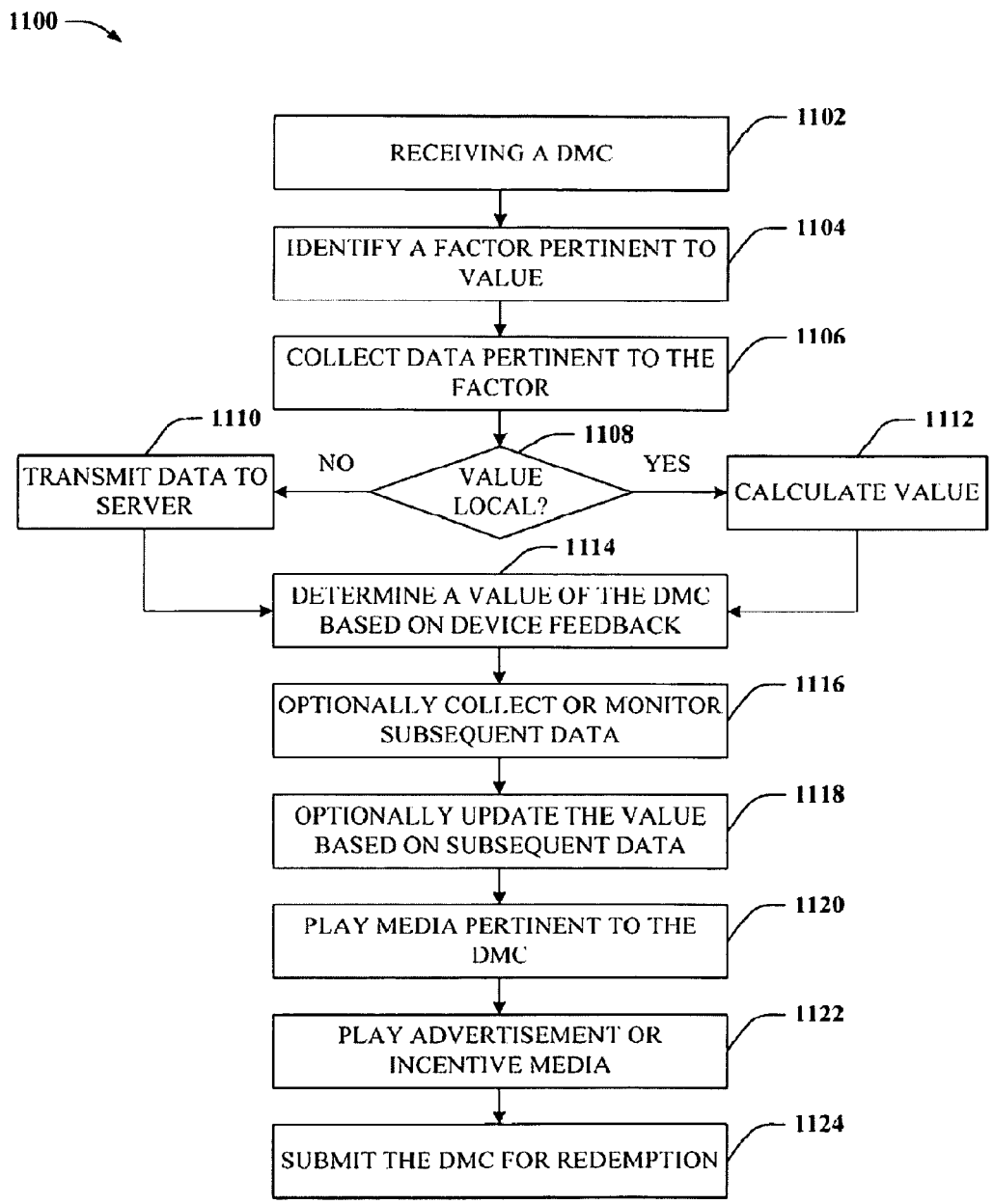
FIG. 11 depicts a flowchart of an example methodology for facilitating valuation and redemption of variable value DMCs in a mobile environment.

FIG. 11 depicts a flowchart of an example methodology 1100 for facilitating valuation and redemption of variable value DMCs in a mobile environment. At 1102, method 1100 can receive a DMC. The DMC can be received over a wireless and/or wired link with a DMC distribution entity (e.g., a component of a mobile network). At 1104, a factor is identified that is pertinent to determining a value of the DMC. The factor can include position of a recipient device, time, user profile information, user transaction history information, stored DMC information, retailer profile information (e.g., including current stock of an item identified in the DMC), vendor profile information (e.g., including a number of other redeemed DMCs, expiration information associated with the DMC), and like information.

At 1106, data pertinent to the factor identified at reference number 1104 is collected. At 1108, a determination is made as to whether the value of the DMC is calculated locally at a device or at a remote device. If the determination is made locally, method 1100 can proceed to 1112 where the value of the DMC is calculated based at least in part on the data collected at reference number 1106. After calculating the value, method 1100 can proceed to 1114.

If, at reference number 1108, the value is determined to be calculated at a remote device, method 1100 proceeds to 1110 and transmits collected data to the remote device (e.g., an Internet server) for calculation. The calculated value is received from the remote device, and method 1100 can proceed to 1114. At 1114, method 1100 can determine a value of the DMC based on remote device feedback or local calculations. At 1116, additional data pertaining to the factor is optionally monitored and/or collected. At 1118, the value is optionally updated based on additional data determined at reference number 1116.

At 1120, media associated with the DMC can be played at a recipient device. The media can describe transactions or products applicable to the DMC, retail locations participating in such transactions, redemption limitations or conditions, methods to update and/or increase the value of the DMC, and so on. At 1122, method 1100 can optionally play advertisements or incentive media included with the DMC, and update the value of the DMC as specified by the DMC. At 1124, method 1100 can submit the DMC for redemption in conjunction with a predetermined transaction at a participating retail entity. As described, method 1100 provides a process for receiving and determining value associated with a DMC based on criteria pertinent to a recipient mobile device. Accordingly, method 1100 depicts a flexible process that enables utilization and redemption of a DMC with minimal interaction with remote server devices.

Figure 12:
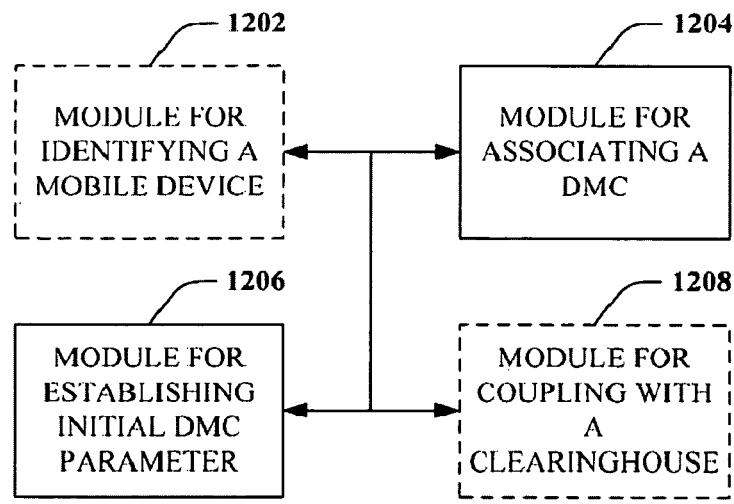
FIGS. 12 and 13 depict block diagrams of example systems that provide and facilitate, respectively, valuation of variable value DMCs in a mobile environment.
Figure 13:
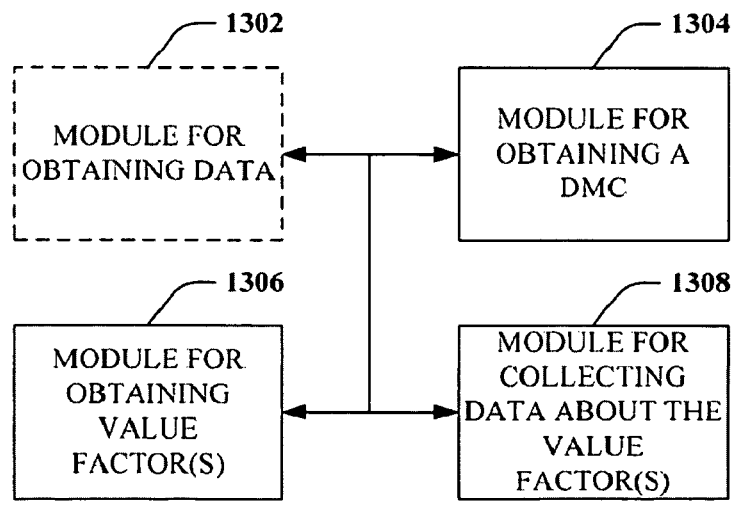

FIGS. 12 and 13 depict block diagrams of example systems 1200 and 1300 that respectively provide and facilitate valuation of variable value DMCs in a mobile environment. Referring initially to FIG. 12, a system 1200 is depicted that can issue a DMC in a mobile environment. System 1200 can include an optional module, module 1202, for identifying a mobile device based on one or more predetermined criteria. The predetermined criteria can be established, for instance, by a sponsor of the DMC. System 1200 includes a module 1204 for associating the DMC to a mobile device, wherein the DMC has at least one variable coupon characteristic. Module 1204 can base distribution of the DMC on the identification performed by the first module 1202. Specifically, if the first module 1202 determines that a mobile device matches specified criteria, the second module 1204 can distribute the DMC to the identified device. In other aspects, distribution can be based on data mined from the mobile device, such as user profile information, including DMC usage history, mobile shopping history, redistribution or social network sharing of DMCs, or the like. Such data can be compared with one or more criteria provided by a sponsor, manufacturer, distributor, and/or retailer associated with the DMC.

In addition to the foregoing, system 1200 further includes a module 1306 for establishing an initial parameter of the variable coupon characteristic. The initial parameter can be established at least in part on one or more factors associated with a recipient mobile device, as described herein. The mobile device can collect data pertinent to the factor(s) and provide such data to the third module 1306 for further analysis. Specifically, such data can be applied to one or more algorithms or functions provided to establish the initial parameter (e.g., an initial redeemable value) of the DMC based on the one or more factors. In accordance with some aspects of the subject disclosure, system 1200 can optionally include a module 1208 for coupling with a clearinghouse. Such a clearinghouse can provide mediation and billing functions in conjunction with redeeming the DMC.

As an example of the foregoing, optional module 1208 can provide transaction, security, authorization, or ID information, or the like, associated with the DMC, to the clearinghouse upon redemption of the DMC. If the transaction complies with applicable specifications (e.g., established by a sponsor of the DMC), the clearinghouse will provide indemnification for a retail entity honoring the DMC in conjunction with a commercial transaction. Accordingly, a user of a recipient device can utilize the DMC similar to an electronic credit card transaction in a mobile environment. Although various differences can remain, such as presentation of the DMC and associated information at the recipient device, at least in some aspects redemption, authorization, and/or indemnification of value by the clearinghouse can be performed electronically, without involving the device user.

Referring now to FIG. 13, a system 1300 is depicted that can facilitate utilization of one or more DMCs in a mobile environment. According to some aspects, system 1300 can include an optional module 1302 for obtaining data over a wireless link. The data can relate to qualifications for receiving a DMC, for instance. For example, an identity of a recipient device, previous transaction history associated with the device, location of the device, etc., can be conveyed to the module 1302 as part of the data. Information provided by module 1302 can be analyzed at a distribution device (not depicted) to determine whether the recipient device qualifies for the DMC.

System 1300 includes a module 1304 for obtaining a DMC or an indication of the DMC (e.g., that identifies the DMC, or a product, service, or source of such product/service, rules for redemption, rules for determining a dynamic characteristic such as value, and so on), wherein the DMC includes at least one variable coupon characteristic. The DMC can comprise, for instance, a file or application, including applicable rules, terms and conditions for redemption, valuation formulae, associated advertisements and media, and the like as described herein. The DMC can be displayed at a user interface of the recipient device to convey applicable information. System 1300 can additionally include a module 1306 for obtaining a factor pertinent to establishing an initial parameter of the variable coupon characteristic. Such factor can be extracted from the DMC, or obtained from an entity that distributes the DMC to the recipient device. In addition to the foregoing, system 1300 can include a module 1308 for collecting data pertinent to establishing the value of the DMC. Accordingly, value can be established according to certain rules and based on certain circumstances of the recipient device. System 1300 can facilitate determination of the value at such device, reducing need for interactions with remote devices. According to some aspects, data collected by the module 1308 can be provided to a remote device for analysis, and such remote device can then distribute the value to the optional module 1302.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications, and variations that fall within the scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of wireless communication, comprising:
   receiving, at a mobile device, a dynamic mobile coupon (DMC) having at least one variable coupon characteristic;
   determining, by the mobile device, a determinable circumstance pertinent to the mobile device without user interaction, wherein a value of the at least one variable coupon characteristic is based on the determinable circumstance;
   determining, by the mobile device, whether the DMC has been submitted for redemption;
   based on the DMC not having been submitted for redemption, obtaining, by the mobile device, additional data pertinent to the determinable circumstance; and
   determining, by the mobile device, a change in the determinable circumstance based at least in part on the additional data, wherein the value of the at least one variable coupon characteristic is automatically modified in response to the change in the determinable circumstance.

2. The method of claim 1, wherein receiving the DMC comprises:
   receiving an indication of the DMC that identifies a sponsor or a transaction associated with the DMC and further identifies at least one of:
   the value for the at least one variable coupon characteristic; or
   a state of the at least one variable coupon characteristic.

3. The method of claim 1, further comprising evaluating the determinable circumstance and establishing the value of the at least one variable coupon characteristic after receiving the DMC.

4. The method of claim 3, wherein:
the value of the at least one variable coupon characteristic is secured to mitigate changes to the value of the at least one variable coupon characteristic by input from the mobile device; or
re-evaluation of the value of the at least one variable coupon characteristic is enabled based at least in part on the input from the mobile device.

5. The method of claim 1, further comprising re-establishing the value of the at least one variable coupon characteristic based in part on at least one of:
the change in the determinable circumstance; or
an input at the mobile device.

6. The method of claim 1, wherein application of the DMC to a transaction and modification of a default characteristic of the transaction are based on the at least one variable coupon characteristic.

7. The method of claim 6, wherein a sponsor of the transaction is reimbursed based at least in part on the default characteristic.

8. The method of claim 1, further comprising determining that the DMC is presented for redemption at a point of sale location associated with the DMC.

9. The method of claim 1, wherein application of a value to a transaction upon redemption of the DMC is based at least in part on a determination of the value of the at least one variable coupon characteristic.

10. The method of claim 1, further comprising employing a redemption value as the value of the at least one variable coupon characteristic and evaluating the determinable circumstance to establish the redemption value based on at least one of:
accepting a value of the at least one variable coupon characteristic;
identifying a threshold change in the determinable circumstance; or
determining that the DMC is presented for redemption.

11. The method of claim 1, wherein the determinable circumstance comprises a location of the mobile device, a feature of the mobile device, a time, user profile information, vendor profile information, DMC profile information, or retailer profile information.

12. The method of claim 1, further comprising at least one of:
receiving, at the mobile device, a mobile device application comprising media bundled with the DMC; or
receiving, at the mobile device, a mobile device application comprising media integrated into the DMC.

13. The method of claim 12, further comprising utilizing, by the mobile device application, an audio, visual, olfactory, or tactile function.

14. The method of claim 13, further comprising employing, by the mobile device application, the audio, visual, olfactory, or tactile function to augment a characteristic of a product or service.

15. The method of claim 12, wherein a product, service, supplier or retailer advertisement pertinent to the DMC is included with the media.

16. The method of claim 12, wherein an advertisement of a third party other than a sponsor, recipient or distributor of the DMC is included with the media.

17. The method of claim 16, further comprising transmitting an indication that the advertisement is played at the mobile device, wherein a transaction with the third party is modified, initiated, or completed based on the indication.

18. The method of claim 1, further comprising receiving an executable module with the DMC, the executable module being configured to evaluate the determinable circumstance and establish or modify the value of the at least one variable coupon characteristic.

19. The method of claim 18, further comprising transmitting, by the executable module, the established or modified value of the at least one variable coupon characteristic to a DMC management server.

20. The method of claim 18, further comprising evaluating, by the executable module, the determinable circumstance based on at least one of:
a threshold change in the determinable circumstance;
an input at the mobile device; or
redemption of the DMC.

21. An apparatus for wireless communication, comprising:
a transceiver of a mobile device configured to receive a dynamic mobile coupon (DMC) having at least one variable coupon characteristic; and
at least one processor of the mobile device configured to:
determine a determinable circumstance pertinent to the mobile device without user interaction, wherein a value of the at least one variable coupon characteristic is based on the determinable circumstance;
determine whether the DMC has been submitted for redemption;
obtain additional data pertinent to the determinable circumstance based on the DMC not having been submitted for redemption; and
determine a change in the determinable circumstance based at least in part on the additional data, wherein the value of the at least one variable coupon characteristic is automatically modified in response to the change in the determinable circumstance.

22. The apparatus of claim 21, wherein:
the value of the at least one variable coupon characteristic is secured to mitigate changes to the value of the at least one variable coupon characteristic by input from the mobile device; or
re-evaluation of the value of the at least one variable coupon characteristic is enabled based at least in part on the input from the mobile device.

23. The apparatus of claim 21, wherein the at least one processor is further configured to re-establish the value of the at least one variable coupon characteristic based in part on at least one of:
the change in the determinable circumstance; or
an input at the mobile device.

24. The apparatus of claim 21, wherein application of the DMC to a transaction and modification of a default characteristic of the transaction are based on the at least one variable coupon characteristic.

25. The apparatus of claim 21, wherein the determinable circumstance comprises a location of the mobile device, a feature of the mobile device, a time, user profile information, vendor profile information, DMC profile information, or retailer profile information.

26. The apparatus of claim 21, wherein the transceiver is further configured to:
receive a mobile device application comprising media bundled with the DMC; or
receive a mobile device application comprising media integrated into the DMC.

27. The apparatus of claim 26, wherein an advertisement of a third party other than a sponsor, recipient or distributor of the DMC is included with the media.

28. The apparatus of claim 27, wherein the transceiver is further configured to transmit an indication that the advertisement is played at the mobile device, wherein a transaction with the third party is modified, initiated, or completed based on the indication.

29. A non-transitory computer-readable medium storing computer-executable instructions comprising:
- at least one instruction to cause a mobile device to receive a dynamic mobile coupon (DMC) having at least one variable coupon characteristic;
- at least one instruction to cause the mobile device to determine a determinable circumstance pertinent to the mobile device without user interaction, wherein a value of the at least one variable coupon characteristic is based on the determinable circumstance;
- at least one instruction to cause the mobile device to determine whether the DMC has been submitted for redemption;
- at least one instruction to cause the mobile device to obtain, based on the DMC not having been submitted for redemption, additional data pertinent to the determinable circumstance; and
- at least one instruction to cause the mobile device to determine a change in the determinable circumstance based at least in part on the additional data, wherein the value of the at least one variable coupon characteristic is automatically modified in response to the change in the determinable circumstance.

30. An apparatus for wireless communication, comprising:
- means for receiving configured to receive, at a mobile device, a dynamic mobile coupon (DMC) having at least one variable coupon characteristic; and
- means for processing configured to:
    - determine a determinable circumstance pertinent to the mobile device without user interaction, wherein a value of the at least one variable coupon characteristic is based on the determinable circumstance;
    - determine whether the DMC has been submitted for redemption;
    - obtain additional data pertinent to the determinable circumstance based on the DMC not having been submitted for redemption; and
    - determine a change in the determinable circumstance based at least in part on the additional data, wherein the value of the at least one variable coupon characteristic is automatically modified in response to the change in the determinable circumstance.

* * * * *